(12) United States Patent
Paul et al.

(10) Patent No.: US 12,299,156 B2
(45) Date of Patent: May 13, 2025

(54) DATA LOSS PREVENTION VIA DUAL MODE INDEXED DOCUMENT MATCHING

(71) Applicant: Zscaler, Inc., San Jose, CA (US)

(72) Inventors: Narinder Paul, Sunnyvale, CA (US);
Arun Bhallamudi, Fremont, CA (US);
Balakrishna Bayar, Bengaluru (IN);
James Tan, Burnaby (CA)

(73) Assignee: Zscaler, Inc., San Jose, CA (US)

( * ) Notice: Subject to any disclaimer, the term of this patent is extended or adjusted under 35 U.S.C. 154(b) by 400 days.

(21) Appl. No.: 17/893,509

(22) Filed: Aug. 23, 2022

(65) Prior Publication Data

US 2023/0037489 A1 Feb. 9, 2023

Related U.S. Application Data

(63) Continuation-in-part of application No. 16/923,225, filed on Jul. 8, 2020, now Pat. No. 11,429,589.

(51) Int. Cl.
*G06F 21/62* (2013.01)
*G06F 16/31* (2019.01)

(52) U.S. Cl.
CPC ........ *G06F 21/6218* (2013.01); *G06F 16/325* (2019.01); *G06F 2221/2101* (2013.01)

(58) Field of Classification Search
CPC ............... G06F 21/6218; G06F 16/325; G06F 2221/2101; G06F 21/606; G06F 21/53; H04L 9/0643; H04L 9/0894; H04L 9/3239
See application file for complete search history.

(56) References Cited

U.S. PATENT DOCUMENTS

| | | |
|---|---|---|
| 8,010,085 B2 | 8/2011 | Apte et al. |
| 8,259,571 B1 | 9/2012 | Raphel et al. |
| 8,607,066 B1 | 12/2013 | Kailash et al. |
| 9,065,800 B2 | 6/2015 | Devarajan et al. |
| 9,350,644 B2 | 5/2016 | Desai et al. |
| 9,621,574 B2 | 4/2017 | Desai et al. |
| 9,654,507 B2 | 5/2017 | Gangadharappa et al. |
| 9,805,204 B1 | 10/2017 | Nachenberg |
| 10,162,967 B1 | 12/2018 | Oliver et al. |

(Continued)

OTHER PUBLICATIONS

Securosis, Understanding and Selecting a Data Loss Prevention Solution, pp. 1-54, Oct. 21 (Year: 2010).*

(Continued)

*Primary Examiner* — Albert M Phillips, III
(74) *Attorney, Agent, or Firm* — Baratta Law PLLC; Lawrence A. Baratta, Jr.; Matthew R. Gore

(57) ABSTRACT

Cloud-based data loss prevention (DLP) systems and methods include monitoring a file to be checked for sensitive data from a user associated with a tenant; obtaining one or more dictionaries for the tenant; identifying a DLP match based on any of identifying exact document matches between the file and files in the one or more dictionaries, identifying same text in the file as in an indexed document in the one or more dictionaries, identifying content in the file that contains a subset of text in an indexed document in the one or more dictionaries, and identifying content that is similar but not exact as the text in an indexed document in the one or more dictionaries; and, responsive to the DLP match, blocking the file in the cloud-based system.

18 Claims, 15 Drawing Sheets

(56) References Cited

U.S. PATENT DOCUMENTS

| | | |
|---|---|---|
| 10,511,607 B2 | 12/2019 | Bansal et al. |
| 11,100,087 B2 | 8/2021 | Gupta et al. |
| 2012/0117080 A1 | 5/2012 | Lamanna et al. |
| 2015/0326613 A1 | 11/2015 | Devarajan et al. |
| 2015/0326615 A1 | 11/2015 | Sinha |
| 2017/0223029 A1 | 8/2017 | Sharma et al. |
| 2017/0332238 A1 | 11/2017 | Bansal et al. |
| 2018/0255060 A1 | 9/2018 | Bansal |
| 2019/0081787 A1 | 3/2019 | Bayar et al. |
| 2019/0319945 A1 | 10/2019 | Levy et al. |

OTHER PUBLICATIONS

Jesse Kornblum, "Identifying almost identical files using context triggered piecewise hashing," Digital Investigation, vol. 3, Sep. 1, 2006, pp. 91-97.

Jun. 18, 2021, European Search Report issued for European Application No. EP 21 15 2978.

\* cited by examiner

DATA LOSS PREVENTION VIA DUAL MODE INDEXED DOCUMENT MATCHING

CROSS-REFERENCE TO RELATED APPLICATION(S)

The present disclosure is a continuation-in-part of U.S. patent application Ser. No. 16/923,225, filed Jul. 8, 2020, which claimed priority to Indian Patent Application No. 202011021883, filed May 26, 2020, the contents of each are incorporated by reference in their entirety.

FIELD OF THE DISCLOSURE

The present disclosure relates generally to networking and computing. More particularly, the present disclosure relates to systems and methods for Data Loss Prevention (DLP) via Indexed Document Matching (IDM).

BACKGROUND OF THE DISCLOSURE

Data Loss Prevention (DLP) involves monitoring of an organization's sensitive data, including data at endpoint devices, data at rest, and data in motion. Conventional DLP approaches focus on a variety of products, including software agents at endpoints, physical appliances, virtual appliances, etc. As applications move to the cloud, users are accessing them directly, everywhere they connect, inevitably leaving blind spots as users bypass security controls in conventional DLP approaches while off-network. Encryption increases the problem because sensitive data is typically concealed in Secure Sockets Layer (SSL)/Transport Layer Security (TLS) traffic, which is difficult and expensive to inspect (in terms of cost, processing capability, and latency). Without visibility and control, organizations are at an increased risk of data loss, due either to unintentional or malicious reasons.

Conventional techniques for catching data include the use of DLP dictionaries and engines. These approaches are used to detect Exact Data Matching (EDM), where specific keywords, classes of data, etc. are flagged. For example, DLP can detect social security numbers, credit card numbers, etc. based on the data format, such as in structured documents, etc. DLP can also detect specific keywords in the DLP dictionaries. However, DLP is difficult with unstructured documents. Unstructured documents are just that; documents that can be free-form and do not have a set structure but are still able to be scanned, captured, and analyzed. For true DLP, it is also important to support the analysis of unstructured documents.

BRIEF SUMMARY OF THE DISCLOSURE

The present disclosure relates to systems and methods for Data Loss Prevention (DLP) via Indexed Document Matching (IDM). As described herein, IDM is the ability to identify and protect content that matches the whole or some part of a document from a repository of documents. This feature provides data leak protection for unstructured documents. Specifically, techniques include identifying exact document matches, identifying the same text in a document as in an indexed document, identifying content that contains a subset of text in an indexed document, and identifying content that is similar but not exactly the same as the text in an indexed document. Customers can index files into multiple user-defined profiles or categories. The results of the identification can yield a score that can be matched to a threshold for detection. The technique can be summarized as similarity detection (i.e., same file, same text, similar text, etc.) and fragment identification (i.e., partial content match) to provide a score that is indicative of a match to an indexed document.

In an embodiment, a method, instructions in a non-transitory computer-readable storage medium, and a DLP service executed by a cloud-based system are presented to perform steps. The steps include obtaining a file to be checked for Data Loss Prevention (DLP); determining a cryptographic hash of the file and comparing the cryptographic hash to corresponding cryptographic hashes of indexed files; responsive to a match between the cryptographic hash and one of the corresponding cryptographic hashes, determining a DLP match and performing an action based thereon; responsive to no match, computing hashes in a raw mode and a text mode for the monitored file; and determining the DLP match with one of the indexed files based on comparing the hashes from the raw mode and text mode with corresponding hashes of the indexed files. The determining the DLP match based on the comparing the hashes utilizes a match score based on a number of the hashes that match and the DLP match is based on the match score being above a threshold. The threshold is user-configurable in value and configurable across a different profile of the indexed files. The determining the DLP match based on the comparing the hashes utilizes a match score, wherein the match score is the highest score between a raw mode score and a text mode score. The steps further include responsive to the DLP match based on the comparing the hashes from the raw mode and text mode, performing an action based thereon. Prior to the obtaining the file, obtaining a lookup table for a tenant associated with a user of the file, wherein the lookup table includes raw mode and text mode hashes indexed to the indexed files. The lookup table is created in an indexing tool, and wherein the indexed files cannot be recreated from data in the lookup table. The file may be of a first file type, wherein the file is determined to match one of the indexed files being a second file type. The file may be of a file type, wherein the file is determined to match one of the indexed files being the same file type. The file is determined to match one of the indexed files having similar text therein.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like;

FIG. 4 is a block diagram of a user device that may be used with the cloud-based system of FIGS. 1 and 2 or the like;

DETAILED DESCRIPTION OF THE DISCLOSURE

The present disclosure relates to systems and methods for Data Loss Prevention (DLP) via Indexed Document Matching (IDM). As described herein, IDM is the ability to identify and protect content that matches the whole or some part of a document from a repository of documents. This feature provides data leak protection for unstructured documents. Specifically, techniques include identifying exact document matches, identifying the same text in a document as in an indexed document, identifying content that contains a subset of text in an indexed document, and identifying content that is similar but not exactly the same as the text in an indexed document. Customers can index files into multiple user-defined profiles or categories. The results of the identification can yield a score that can be matched to a threshold for detection. The technique can be summarized as similarity detection (i.e., same file, same text, similar text, etc.) and fragment identification (i.e., partial content match) to provide a score that is indicative of a match to an indexed document. As described herein, IDM means performing matching of a target document to indexed documents. The objective is to flag (detect) documents that are close, but not exact to the indexed documents.

Example Cloud-Based System Architecture

Figure 1:
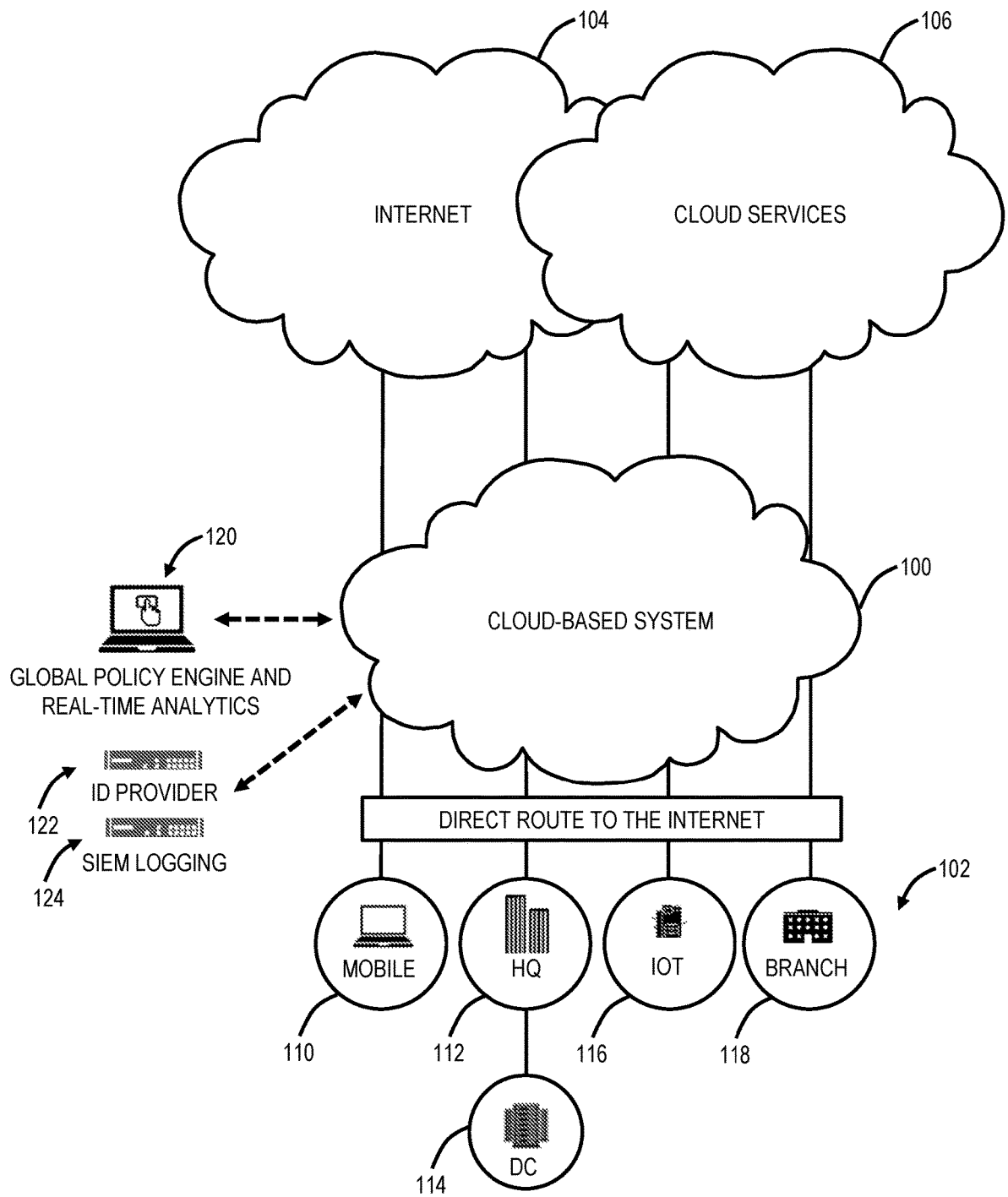
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including SSL/TLS traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
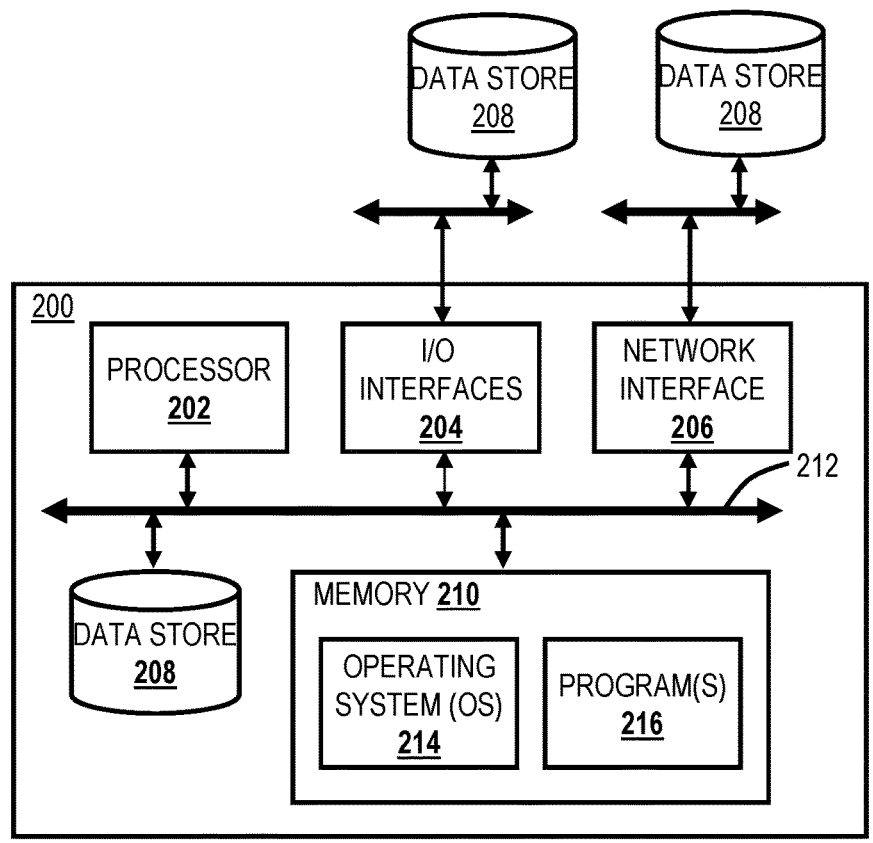

For illustration purposes, the users 102 of the cloud-based system 100 can include a mobile device 110, a headquarters (HQ) 112 which can include or connect to a data center (DC) 114, Internet of Things (IoT) devices 116, a branch office 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 106) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
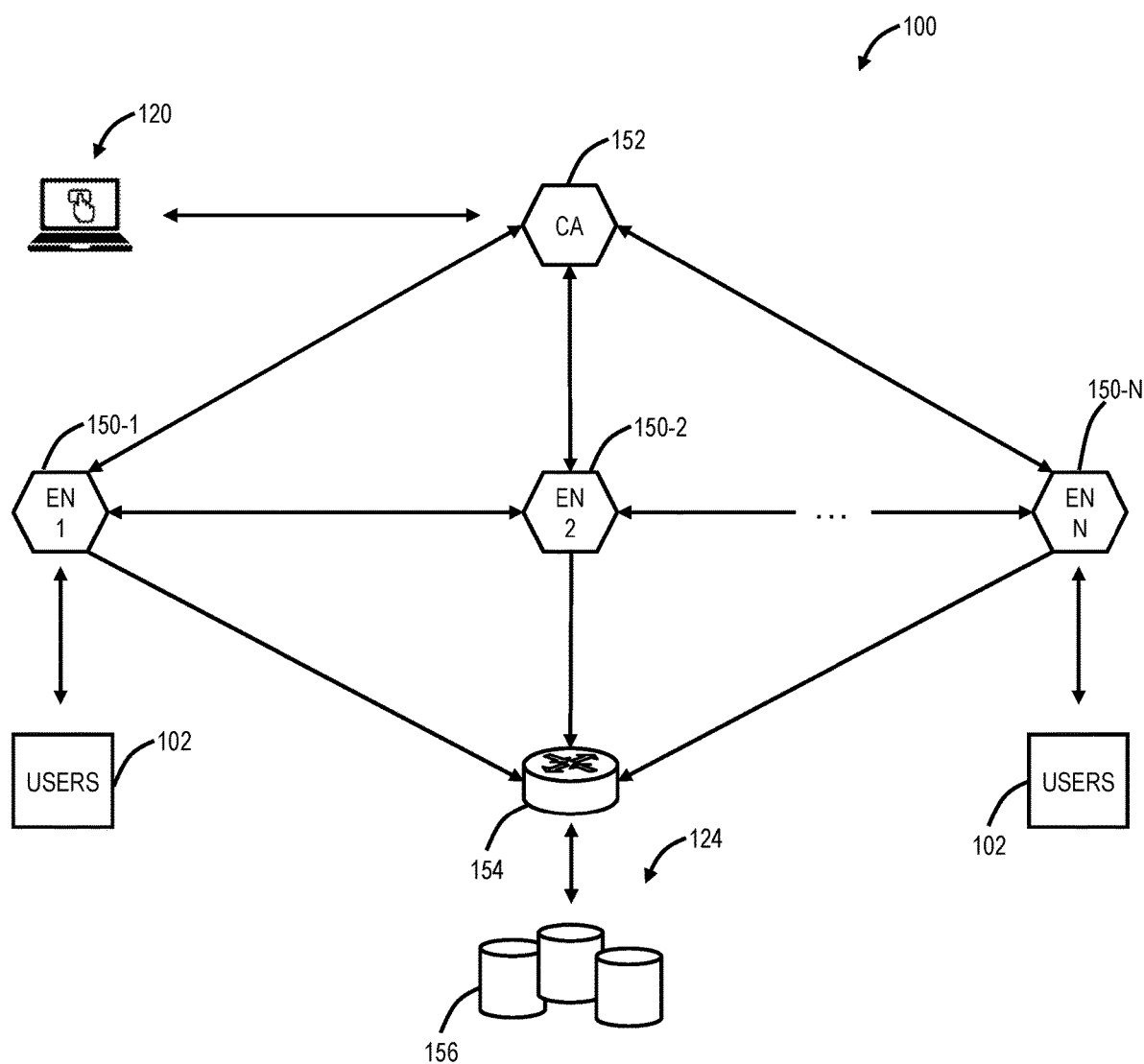
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (VM) executed on physical hardware, etc. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization.

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 in order to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

Once downloaded, a tenant's policy is cached until a policy change is made in the management system 120. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources in lieu of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
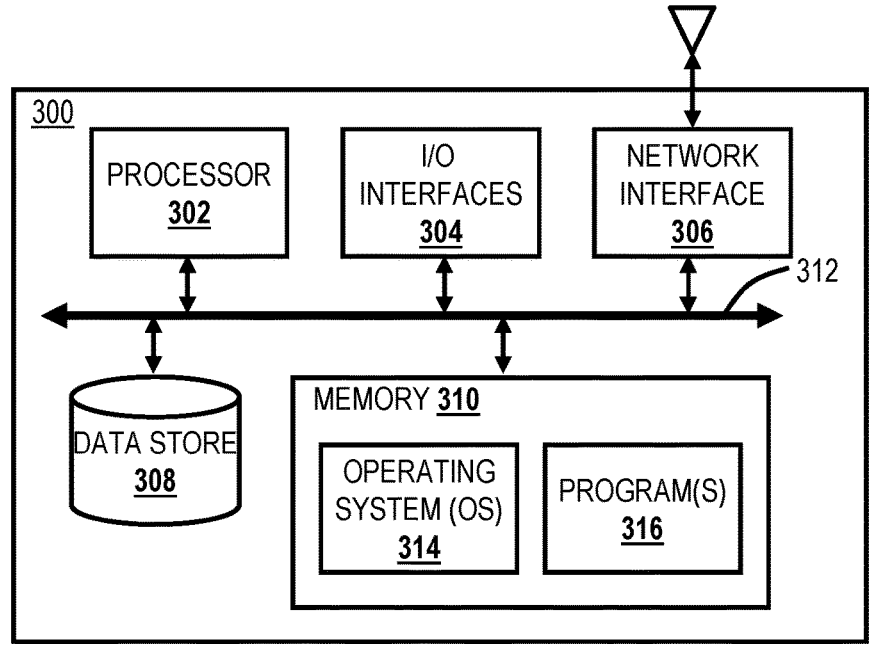

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Data Loss Prevention

Data Loss Prevention (DLP) includes detection of potential data breaches/data ex-filtration transmissions and prevention by monitoring, detecting, and blocking sensitive data while in use (endpoint actions), in-motion (network traffic), and at rest (data storage). Note, the terms "data loss" and "data leak" may be used interchangeably. In various embodiments, the cloud-based system 100 is configured to perform DLP functionality for a tenant. Data At Rest (DAR) includes the ability to scan file shares, SharePoint, or other cloud services providing file storage, and the like. Data in Motion (DIM) includes the ability to monitor data leaving the organization via multiple protocols, including SSL traffic. The multiple protocols can include, without limitation, Simple Mail Transport Protocol (SMTP), Instant Messaging (IM), File Transport Protocol (FTP), FTP Secure (FTPs), Hypertext Transfer Protocol (HTTP), HTTP Secure (HTTPs), and the like. The Data at Endpoint (DAE) monitors via an agent to monitor the data store 308 at the user devices 300.

The cloud-based system 100 can provide DLP functionality to inspect all traffic, including encrypted traffic, no matter where, how, when, etc. the user 102 connects. This provides identical protection whether the user 102 is located on or off-network. The cloud-based system 100 provides the same level of security to all the users 102 by moving security to the cloud, located between the users 102 and the Internet 104 and the cloud services 106. Cloud DLP policy follows users 102 where they work—on- or off-network—and provides the same level of protection to all users 102 at all times.

The cloud-based system 100 provides a full SSL inspection of all traffic. Of note, most traffic is encrypted, and no subject to inspection by traditional DLP approaches. The cloud-based system 100 is a proxy by design system, with the enforcement nodes 150 in between and performing SSL inspection on all traffic, without the inspection limitations of appliances. Further, the cloud-based system 100 is architected inline so it can block sensitive information before it leaves the tenant's network, instead of focusing on damage control after a compromise. The cloud-based system 100 is user-based, not capacity-based, allowing cloud-based DLP scale elastically. The cloud-based system 100 is configured to offer DLP as a service, eliminating redundancies of managing various appliances, reducing the resources needed to stand up and maintain point products.

The DLP functionality via the cloud-based system 100 can include content matching, Exact Data Match (EDM), granular policies, and flexible remediation. The content matching can utilize preconfigured and/or custom DLP dictionaries supporting Regular Expressions (Regex), keywords, etc. Content detection can include numeric detection, trained dictionaries/fuzzy search, and Boolean logic. The numeric detection can detect Social Security Numbers (SSNs), medical numbers (CCNs, insurance numbers, etc.), pattern matching, etc. The trained dictionaries/fuzzy search can match financial data, source code, medical data, names, adult content, CRM data, gambling, weapons, etc. The Boolean logic can combine context and detection with logical operators, keywords, and phrases. The DLP functionality can also support context detection based on people (users, groups, departments, etc.), location (country, branch office, etc.), and reporting.

Figure 5:
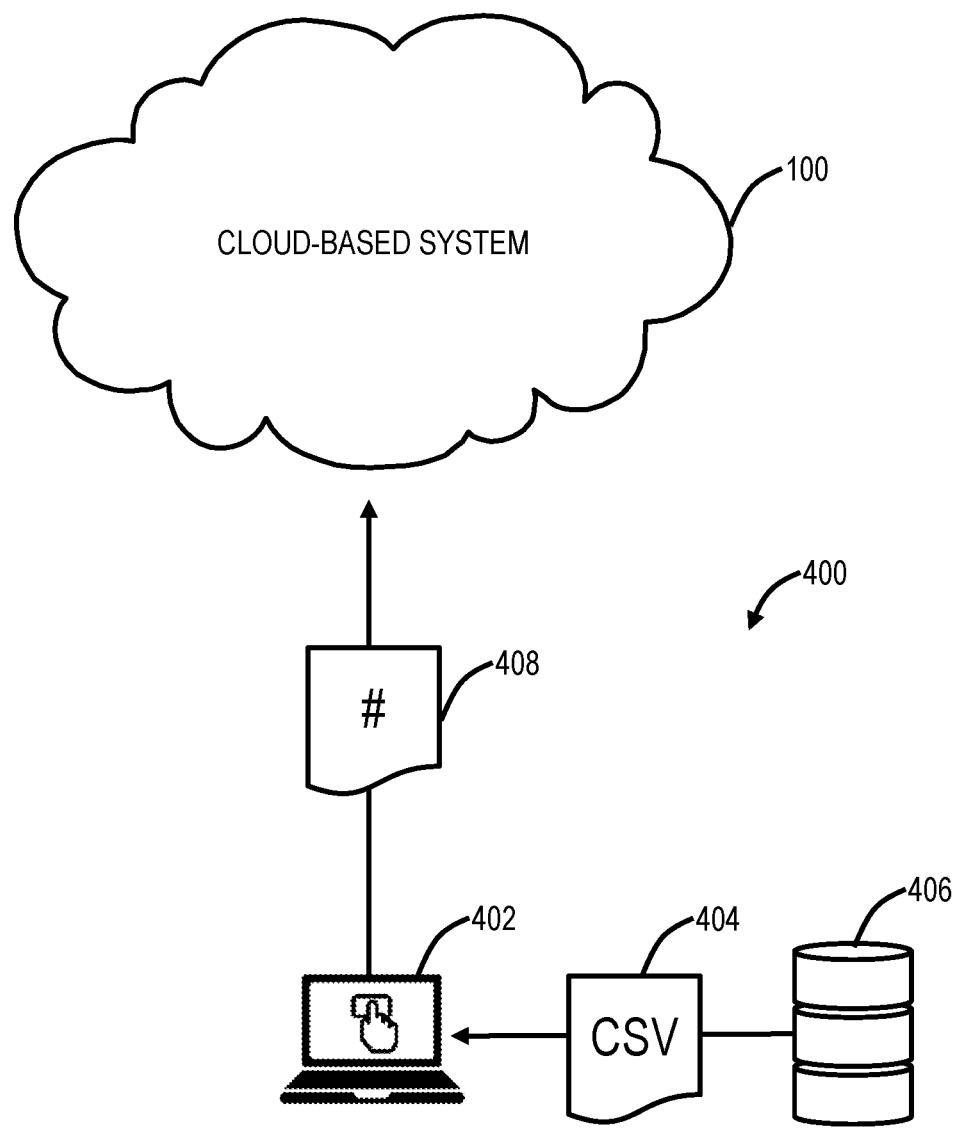
FIG. 5 is a network diagram of an Exact Data Match (EDM) system for use with the cloud-based system.

FIG. 5 is a network diagram of an EDM system 400 for use with the cloud-based system 100. The EDM system 400 provides the ability to fingerprint sensitive data without transferring it to the cloud. The EDM system 400 includes an indexing tool 402 that is configured to receive data 404 from a database 406, such as a Comma Separated Value (CSV) file. The indexing tool 402 can be located on-site with a tenant, to avoid the need to send sensitive data to the cloud-based system 100. To support such a configuration, the indexing tool 402 hashes values from the data 404, and only hash data 408 is sent to the cloud-based system 100, not plain text. For example, a process related to EDM is described in commonly assigned U.S. patent application Ser. No. 15/790,513, filed Oct. 23, 2017, and entitled "Identification of tokens in a byte stream using structured data," the contents of which are incorporated by reference in their entirety. IT administrators can implement multi-criteria policies to target specific users, groups of users, locations, destinations, file types, etc. The flexible remediation can include blocking content as well as monitoring, alerting, etc. Alternatively, the indexing tool 402 could be located in the cloud-based system 100 with secure access for each tenant and other security techniques such as encrypted file storage in the database 406, etc.

The DLP functionality via the cloud-based system 100 can provide real-time visibility, contextual reporting, and auditor workflow, secure Internet Content Adaptation Protocol (ICAP) forwarding, and SIEM integration. The real-time visibility provides IT administrators with instant visibility of violations as they occur for remediation and compliance. The contextual reporting and auditor workflow can provide notifications with DLP incidents. The secure ICAP forwarding supports integration with third-party DLP solutions. The SIEM integration can stream real-time logs to the system 124.

DLP Service

Figure 6:
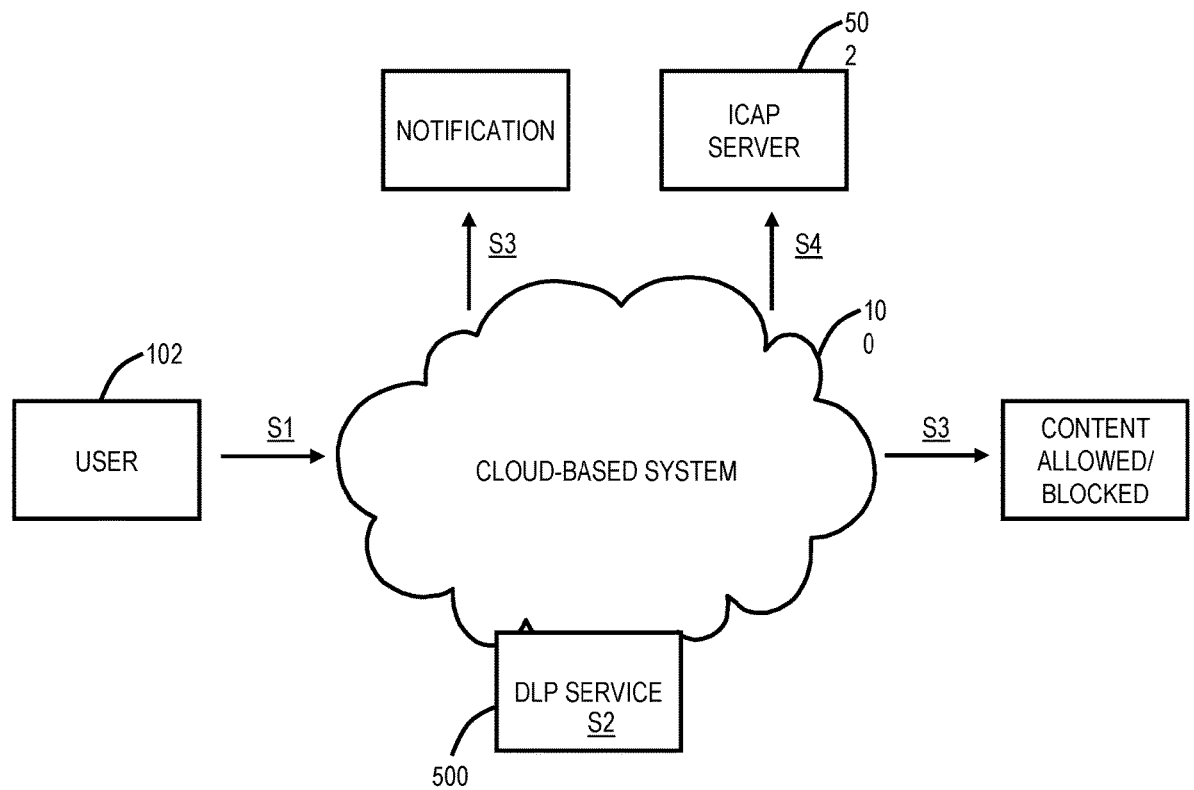
FIG. 6 is a block diagram of a DLP service implemented via the cloud-based system.

FIG. 6 is a block diagram of a DLP service 500 implemented via the cloud-based system 100. Here, a user 102 attempts to send content (step S1). The content is filtered by the DLP service 500 in the cloud-based system 100 (step S2). Based on the filtering, the content is either allowed or blocked (step S3). If there is a DLP rule triggered, there can be a notification or alert (step S4) and data provided to an ICAP server 502 (step S5). The filtering is performed by one or more DLP engines looking for specific criteria, e.g., size, location, keywords, etc. The notification can be an alert or equivalent to an auditor, IT administrator, etc. The DLP service 6500 can send data to the ICAP server 502, including the client IP address and username of the user 102 (via ICAP X-headers). The present disclosure also includes a copy of the HTTP POST request that contains the relevant file or content (if the content is from HTTP Form data or a text file). The host URL that the user was sending content can also be included here.

The DLP dictionaries include a set of data that are designed to detect specific kinds of information in the user traffic. Predefined dictionaries can include bank routing numbers, adult content, credit cards, financial statement, gambling, illegal drips, medical information, names, Salesforce data, SSN, source code, etc. In addition to the predefined dictionaries, tenants can provide custom dictionaries, such as via the EDM system 400. A custom DLP dictionary can include alphanumeric patterns that match a wide variety of data types. For example, one can define patterns to detect data like phone numbers, driver's license numbers, or credit card numbers for specific issuers.

A DLP engine is a collection of one or more DLP dictionaries. When one defines DLP policy rules, one must reference DLP engines, rather than DLP dictionaries. By using a DLP engine, one can create rules to detect content that encompasses more than one dictionary. For example, if an organization wants to protect social security and credit card numbers, one would create a rule using the PCI Engine, which contains the Credit Cards and Social Security Numbers dictionaries. When a DLP engine uses two or more dictionaries, the DLP service 500 can block content only if all of the dictionaries in the engine are triggered. The DLP engines can scan files with a maximum size of 100 MB. The DLP service 500 can provides four predefined engines:

HIPAA: This engine is designed to detect Health Insurance Portability and Accountability Act (HIPAA) violations, using the Social Security Numbers (US) and Medical Information dictionaries.

GLBA: This engine is designed to detect violations of the Gramm-Leach-Bliley Act (GLBA), using the Social Security Numbers (US) and Financial Statements dictionaries.

PCI: This engine is designed to detect Payment Card Industry (PCI) compliance violations, using the Credit Cards and Social Security Numbers (US) dictionaries.

Offensive Language: This engine is designed to detect offensive language, using the Adult Content dictionary.

The DLP engines can be used to detect data, allow or block transactions, and notify an organization's auditor when a user's transaction triggers a DLP rule. If an organization has a third-party DLP solution, namely the ICAP server 502, the DLP service 500 can forward information about transactions that trigger DLP policy via secure ICAP.

DLP Notifications

In an embodiment, by default, the Subject line for the notification uses the text DLP Violation: with the ${TRANSACTION_ID} and ${ENGINES} macros. These macros will list the ID of the transaction that triggered the DLP rule, as well as the DLP engines that triggered. However, this text can be modified as described herein and can include the ${USER} and ${URL} macros as well.

a) a notification includes a name.

b) a subject line of the notification by default can use the text DLP Violation: with the ${TRANSACTION_ID} and ${ENGINES} macros. These macros will list the ID of the transaction that triggered the DLP rule, as well as the DLP engines that triggered. However, this text can be modified, and one can include the ${USER} and ${URL} macros as well. For a complete list of macros, see step e below.

c) the violating content can be included, such as via an attachment of the violating content added to the notifications emailed to auditors.

d) a TLS connection can be used to send the notification email. Here, the email recipients SMTP server must support TLS. R is recommended that TLS is used to send an email that might contain sensitive content. Also, the attachments and the violating content are never stored in the cloud-based system 100 or the DLP service 500. Once sent, all such data is deleted from memory.

e) In the Message as Plain Text or Message as Hypertext Markup Language (HTML) sections, one can create a customized message detailing why the content was blocked. This message is delivered via email (Delivery Status Notification) to the auditor when a policy triggers and blocks content.

The following macros can be used in the message body and subject line:

| Macro | Description |
| --- | --- |
| ${CLIENT_IP} | This macro is used to specify the user's IP address, if available. |
| ${DICTIONARIES} | This macro is used to list the DLP dictionaries associated with the triggered policy, which includes or the match count (f dictionaries such as Credit Cards) or score (for machine learning dictionaries such as Financial Statements or Source Code), for each dictionary triggered due to a content match. |
| ${DLPMD5} | This macro is used to provide the MD5 hash of the file that triggered the DLP rule. This number can be used as a filter in the Web Logs to find the relevant transactions. |
| ${DLPTRIGGERS} | This macro is used to list the content (up to 10 items) that matched a dictionary. |
| ${ENGINES} | This macro is used to list the DLP engines associated with the triggered policy. |
| ${RULENAME} | This macro is used to specify the name of the triggered DLP rule. |
| ${TIMESTAMP} | This macro is used to specify the time the user attempted to send violating content. |
| ${TRANSACTION_ID} | This macro is used to provide the transaction ID of the transaction that triggered a DLP rule. This unique number can be used as a filter in the Web Logs to find the relevant transactions. |
| ${TYPE} | This macro is used to specify the Cloud App category for the destination traffic. For example, "File Sharing" can be a type. If the destination does not match any Cloud App categories, the type will be "Web Posting." |
| ${URL} | This macro is used to specify the destination URL (i.e., the URL accessed). |
| ${USER} | This macro is used to specify the name of the user, if any. If the user's name is unavailable, "unknown" is used. |

ICAP-DLP Service Communication

Figure 7:
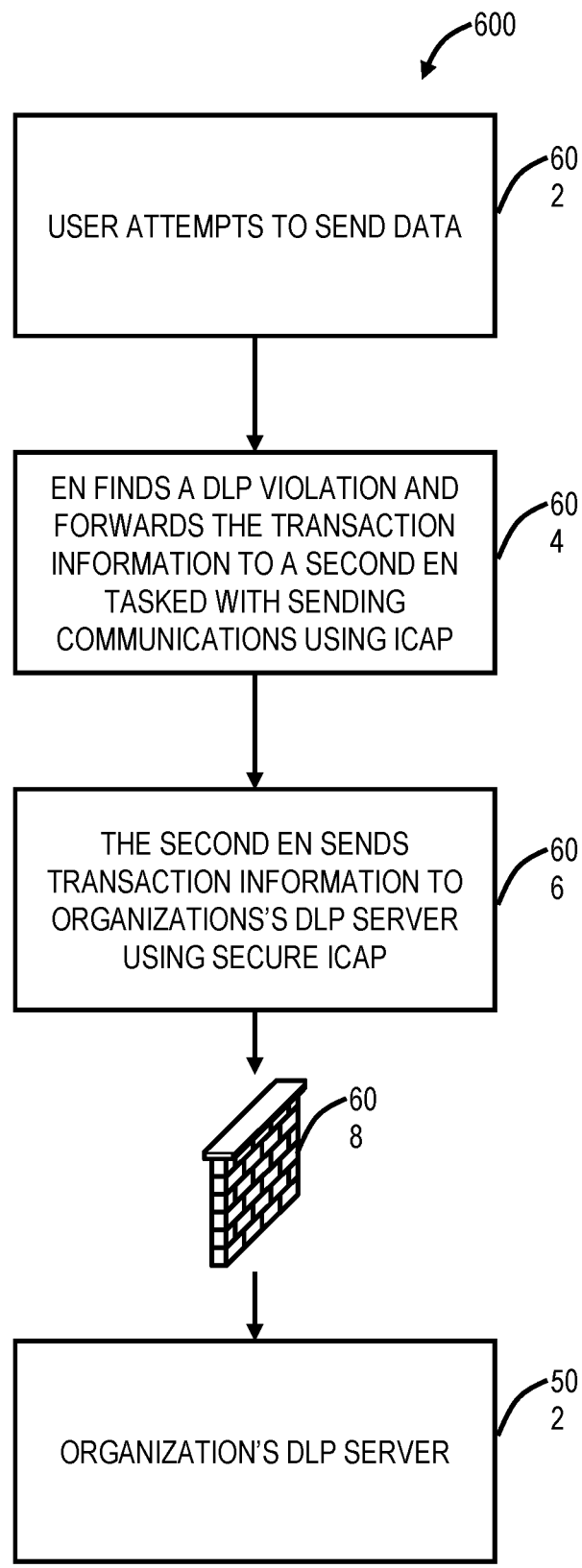
FIG. 7 is a flowchart illustrating a process for communication between the DLP service and the ICAP server.

FIG. 7 is a flowchart illustrating a process 600 for communication between the DLP service 500 and the ICAP server 502. It is a configuration option, via the management system 120, to have the DLP service 500 send information about DLP policy violations to the ICAP server 502. Specifically, the ICAP server 502 is an organization's DLP server and can be one of on-premises (behind an organization's firewall) or cloud-based. Note, the terms ICAP server 502 and DLP server can be utilized interchangeably herein. Once provided by the DLP server 500 to the ICAP server 502, the organization can implement its data loss prevention or remediation workflows.

When the DLP service 500 sends information to the ICAP server 502, it does not do so from an enforcement node 150 on the cloud that initially inspects the users' 102 transactions. If an enforcement node 150 finds that a transaction violates a DLP policy rule and further, the rule specifies that the DLP service 500 sends violation information to the organization's DLP server, that enforcement node 150 will forward the transaction information to a second enforcement node 150. The second enforcement node 150 is on a different cloud that the DLP service 500 uses for sending communications to the ICAP server 502.

In an embodiment, the second enforcement node 150 sends the following information about the transaction to the ICAP server 502:

Client IP and username via ICAP X-headers; and
a copy of the HTTP POST request that contains the file that violated the DLP policy, or if the content is from HTTP Forms data, a copy of the content that violated the DLP policy. The host URL to which the user was attempting to send content would also be included here.

The process 600 includes a user 102 attempting to send data, with the cloud-based system 100 providing monitoring (step 602). An enforcement node 150 finds a DLP violation and forwards the transaction information to a second enforcement node 150 tasked with sending communications using ICAP to the ICAP server 502 (step 604). The second enforcement node 150 sends the transaction information to the ICAP server 502 using secure ICAP (step 606).

An organization's firewall 608 must be configured to allow communications from the second enforcement node 150. Further, to protect the organization's data, the second enforcement node 150 can send the above information in an encrypted form via secure ICAP. However, because most DLP servers (ICAP servers 502) can only read unencrypted information, another option is to utilize a tunnel on the ICAP server 502, such as an open-source application called the stunnel application for a TLS/SSL tunnel. After installation, the stunnel application and the second enforcement node 150 can establish an SSL communication, and the second enforcement node 150 can send transaction information in encrypted form to the ICAP server 502. The stunnel application will then decrypt the transaction information for the ICAP server 502.

Once this process 600 takes place, the ICAP server 502 can read the ICAP communications from the second enforcement node 150 and report incidents as applicable in the ICAP server 502.

EDM

Figure 8:
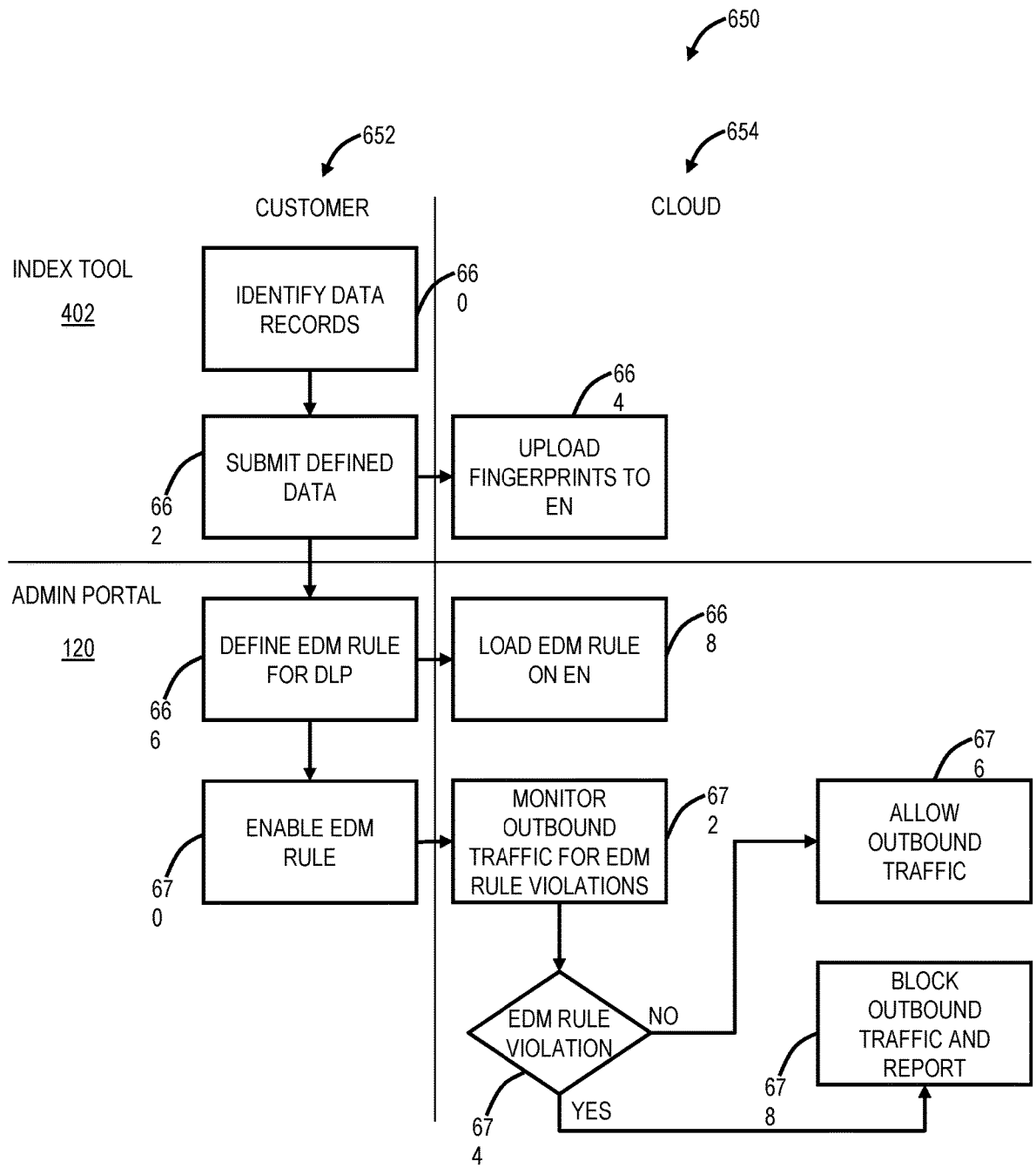
FIG. 8 is a flowchart of a process for Exact Data Match (EDM) with operations described on-premises and in the cloud, and between the indexing tool on-premises and the management system for the cloud-based system.

FIG. 8 is a flowchart of a process 650 for Exact Data Match (EDM) with operations described on-premises 652 and in the cloud 654, and between the indexing tool 402 and the management system 120. Again, the EDM index templates allow the DLP service 500 to identify a record from a structured data source that matches predefined criteria. For example, an organization might want to protect Personally Identifiable Information (PII) from being lost or might want to give employees the ability to share their own PII data using a personal email or file-sharing account. In either case, identifying and correlating multiple tokens that contribute to a particular record, to identify ownership of that data, is crucial.

In the indexing tool 402, data records are identifier (step 660), and defined data is submitted (step 662), and fingerprints are uploaded to the enforcement nodes 150 (step 664). Again, importantly, the data itself is not uploaded, but hash signatures. In the admin portal (management system 120), an IT administrator can define an EDM rule for the DLP service (step 666), load the EDM rule on the enforcement nodes 150 (step 668), enable the EDM rule (step 670), etc. The enforcement nodes 150 can monitor outbound traffic for EDM rule violations (step 672), and responsive to an EDM rule violation check (step 674), either allow the outbound traffic (step 676) or block the outbound traffic and report (step 678)/

Creating an EDM template allows one to define these tokens (i.e., criteria) for data records by importing a CSV file. Once the data is defined and submitted, it is possible to apply the template to a custom DLP dictionary or engine, which will use the criteria to match against the data records. The DLP service 500 will then evaluate the EDM-defined DLP rule with the appropriate action for any outbound traffic. When creating an EDM index template, tokens (i.e., criteria) are defined for the data records, and at least one primary field is specified. The primary field is a unique key that the DLP policy rules are based on. It is a required field that must be unique based on the data records.

The following illustrates some consideration before creating an EDM index template. Review the DLP policy that is to be created and the data to be protected. During the review, consider the data that must be included in the EDM index template. Try to create a template where the data records need to be indexed once, to avoid the need to re-index. Finally, review the data records to avoid duplication.

Let's use the following example: Assume the organization is a bank with an employee database, and the objective is to protect the employees' PII as well as their company credit card information. The database records contain the following data fields: First Name (FName), Last Name (LName), Social Security Number (SSN), Credit Card Number (CCN), Mobile Phone Number, Postal Code, Street Address, and so on. The DLP dictionaries or engines that need to be created with EDM, which can then be used in the DLP policies, must cover a series of field combinations to protect the employees' information adequately. So, based on your records in this example, any of the following data field combinations could be used to create a DLP dictionary:

---
SSN, FName, LName
CCN, FName, LName
SSN, CCN, LName
SSN, CCN, FName, LName

---

However, the EDM index template created using the indexing tool 402 must allow the dictionary to cover the field combinations required. This can be accomplished by selecting a primary field based on the data field combination needed. Using the example of the bank, specifying a primary field allows the creation of a single EDM index template to protect the employees' information, where:

all of the data field combinations required for an employee PII DLP dictionary and associated policies are covered.

all of the data field combinations required for a credit card DLP dictionary and associated policies are covered, whenever a company credit card is issued to an employee.

the employee data records only need to be indexed once.

So, using the indexing tool 402, an EDM index template would be created that includes the following fields: SSN, CCN, FName, and LName. To create the employee PII DLP dictionary, SSN can be selected as a primary field. However, to create the company-issued employee credit card DLP dictionary using the same template, select CCN as a 2nd primary field. The other included fields (i.e., FName, LName) will be applied as Secondary Fields for both dictionaries. Finally, in this example, BankNum is not a required data field for the DLP policies.

DLP Incident Forwarding

Figure 9:
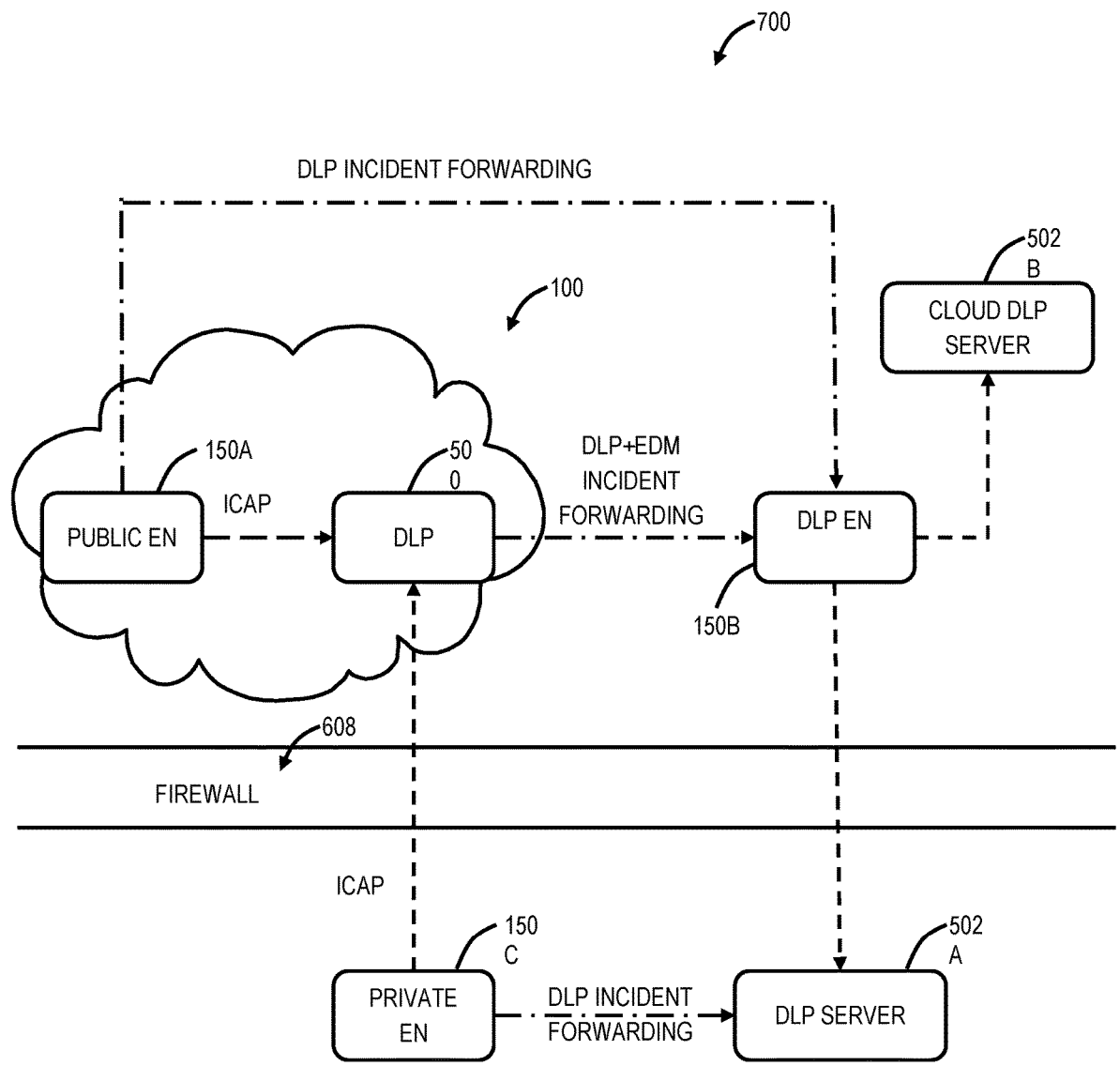
FIG. 9 is a network diagram of a DLP incident forwarding system with the DLP service operating in the cloud-based system to provide DLP incident information to an organization's DLP server.

FIG. 9 is a network diagram of a DLP incident forwarding system 700 with the DLP service 500 operating in the cloud-based system 100 to provide DLP incident information to an organization's DLP server 502. As described above, when a DLP rule is triggered, incident information is forwarded via passive ICAP and/or email notification. Via Passive ICAP, the DLP service 500 can forward the original upload to the customer's designated ICAP server 502. To provide additional information and context, the present disclosure ensures this ICAP message contains information regarding the DLP scan results (dictionary, engine, search score, triggers, etc.) or transaction details (time, user, URL, cloud app, etc.). The ICAP message also contains the full uploaded data in case of a multipart request. The email notification can also have all these details.

The feature discussed in this document describes a technique to forward the content that triggered the DLP rule along with the DLP scan information to a designated ICAP server 502. The ICAP server 502 can be either customer specified, on-premises ICAP server 502A, or a cloud-based ICAP server 502B that works with the cloud-based system 100. In FIG. 9, the public enforcement node 150A is configured to implement monitoring of the users 102 for the DLP service 500. The public enforcement node 150A is referred to as public due to the fact it is part of the cloud-based system 100 and operates in a multi-tenant manner.

On detection of a DLP rule violation, the public enforcement node 150A triggers the DLP service 500 via an ICAP message. The public enforcement node 150A can send a DLP incident forwarding message to the DLP enforcement node 150B. The DLP enforcement node 150B is the second enforcement node 150 described above, and it is tasked with forwarding the DLP incidents to the DLP servers 502A, 502B. The DLP service 500 can provide DLP and EDM incident forwarding information to the DLP enforcement node 150B. Note, in some embodiments, an organization may include a private enforcement node 150C located behind the firewall 608 on the same network as the DLP server 502A. Here, the private enforcement node 150C can perform similar functionality as the public enforcement node 150A, but it can directly communicate to the DLP server 502A, being on the same, secure network.

DLP Incident Forwarding—Message Format

The message format for the DLP incident forwarding can be a multipart/mixed Multipurpose Internet Mail Extensions (MIME) message that includes DLP triggering content+DLP scan metadata. The DLP triggering content is the content that triggered the DLP rule. The DLP triggering content+ DLP scan metadata can be sent as attachments in a multipart/mixed message. Two cases arise, depending upon how the data is uploaded, namely a single part or a multipart message.

For a single part, the following applies
Add headers
"Transfer-Encoding: chunked"
"Content-Type: multipart/mixed; boundary=---------icapfwd"
For the 1st attachment (original body) add MIME headers
MIME headers=(Content-Type, Content-Disposition, Content-Transfer-Encoding)

Example

Content-Type: application/octet-stream
Content-Disposition: attachment; filename=abc.xyz;
Content-Transfer-Encoding: binary
For a multipart, the following applies
Add header
"Transfer-Encoding: chunked"
Modify original multipart header to multipart/mixed and add a new boundary.
1) content that triggered the dlp rule along with the MIME headers for that part. MIME headers=(Content-Type, Content-Disposition, Content-Transfer-Encoding)

The DLP scan metadata can be in JavaScript Object Notation (JSON) format with the below MIME headers.

```
Content-Type: application/json
Content-Disposition: attachment; filename=scan_results.json;
Sample json data
{
    "transaction": {
        "time" : "03/28/2020:9:15:30 GMT",
        "client ip": "111.111.111.111",
        "type": "general browsing post",
        "url": "cgi-lib.xxxyy.edu/ex/fup.cgi",
        "user": "abc@xyc.com"
    },
    "content": {
        "filetype": "text",
        "filename": "data.txt",
        "md5": "e6326a3f1d38bbe90bf6ec465ea6d982"
    },
    "dlp": {
        "engines": [{
            "name": "PCI",
            "rule": "SSN > 2 AND CCN > 2"
        },
        {
            "name": "custom_eng_1",
            "rule": "custom_eng_1 > 0"
        }
        ],
        "dictionaries": [{
            "name": "SSN",
            "searchscore": 3,
            "triggers": ["489-36-8350", "514-14-8905", "690-05-5315"]
        },
        {
            "name": "CCN",
            "searchscore": 3,
            "triggers": ["4929-3813-3266-4295", "5370-4638-8881-3020", "4916-4811-5814-8111"]
        },
        {
            "name": "custom_dict_1",
            "searchscore": 1,
            "triggers": ["custom phrase"]
        }
        ]
    }
}
```

Cloud ICAP Server

Figure 10:
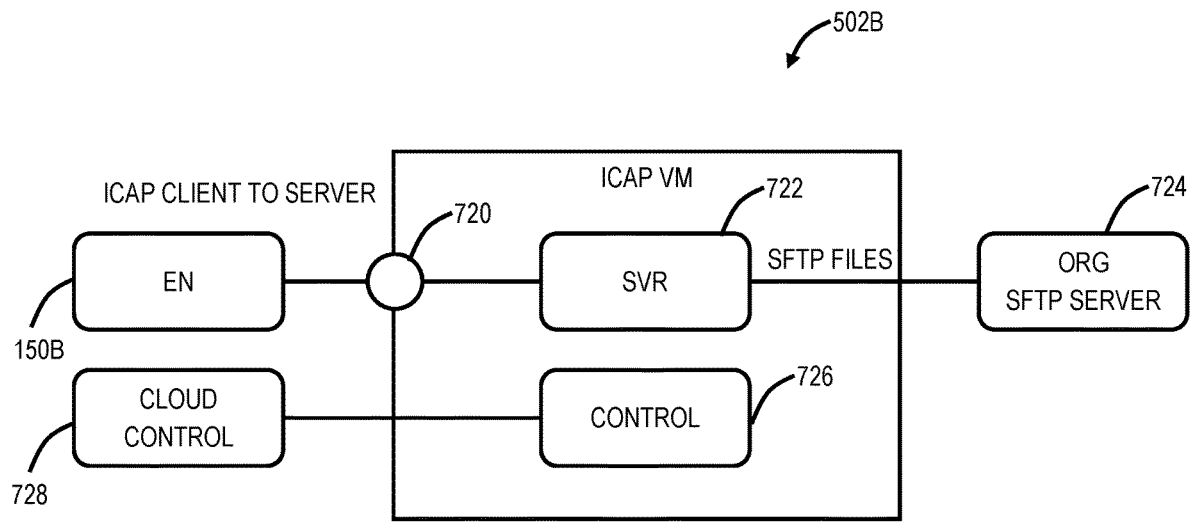
FIG. 10 is a block diagram of a cloud DLP server.

FIG. 10 is a block diagram of a cloud DLP server 502B. In an embodiment, the cloud DLP server 502B can be a Virtual Machine (VM), executed on the server 200, as well as part or separate from the cloud-based system 100. The cloud DLP server 502B includes a public IP address 720 that is configured to receive the ICAP messages from the DLP enforcement node 150B. The cloud DLP server 502B includes an incident response server 722 that is configured to receive the ICAP messages and convert them to a Secure File Transfer Protocol (SFTP) format and provide to an organization's SFTP server 724. The cloud DLP server 502B can also include control 726 that operates with a cloud control 728.

The incident response server 722 is configured to set up client certificates with the cloud-based system 100 and setup server certificates with the DLP enforcement node 150B. The incident response server 722 is further configured to set up Secure Shell (SSH) public key authentication with the organization's SFTP server 724. The control 724, 728 is used for download and install build, requires client certificate to be installed for authentication with the cloud-based system 100. The incident response server 722 can include a process that listens on a public IP:1344 and accepts SSL connection only.

The client certificate is used for authentication from the incident response server 722 to the cloud-based system 100. The server certificate is used for the incident response server's 722 ICAP server process. The enforcement node's 150B ICAP client needs to do verification against the incident response server 722.

DLP Incident Forwarding Process

Figure 11:
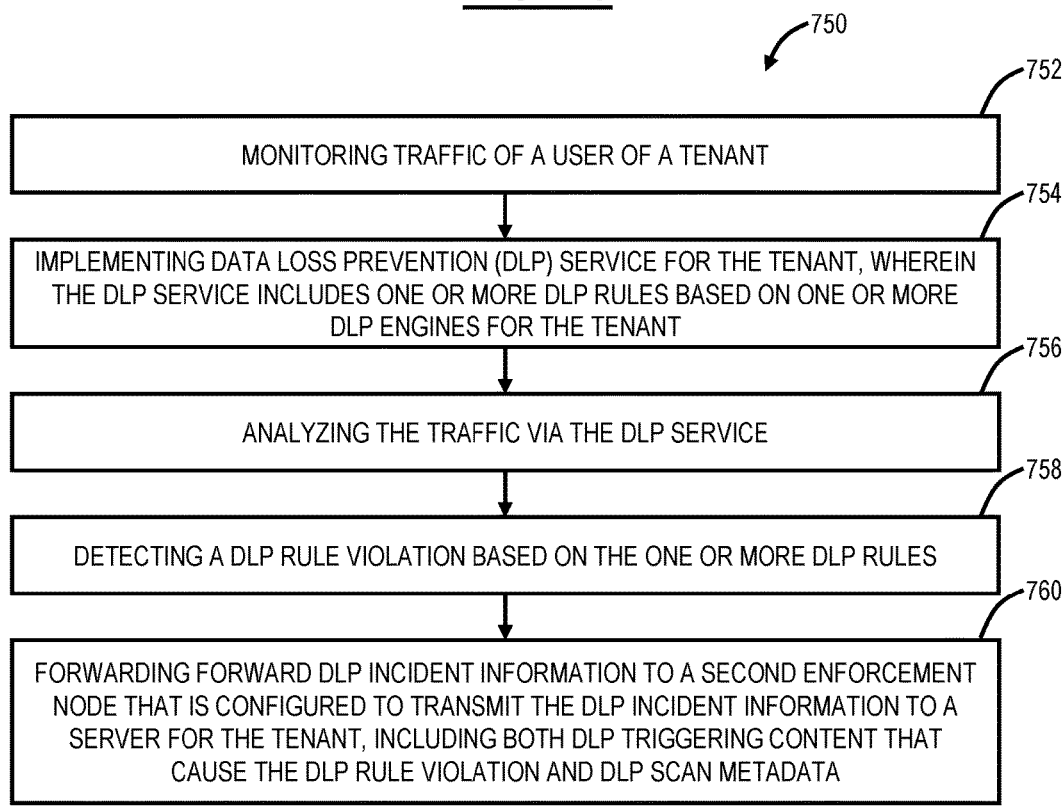
FIG. 11 is a flowchart of a DLP incident forwarding process.

FIG. 11 is a flowchart of a DLP incident forwarding process 750. The DLP incident forwarding process 750 contemplated operation as a computer-implemented method, embodied in a non-transitory computer-readable storage medium having computer-readable code stored thereon for programming one or more processors at a first enforcement node in a cloud-based system, and via the cloud-based system.

The process 750 includes monitoring traffic of a user of a tenant (step 752); implementing Data Loss Prevention (DLP) service for the tenant, wherein the DLP service includes one or more DLP rules based on one or more DLP engines for the tenant (step 754); analyzing the traffic via the DLP service (step 756); detecting a DLP rule violation based on the one or more DLP rules (step 758); and forwarding forward DLP incident information to a second enforcement node that is configured to transmit the DLP incident information to a server for the tenant, including both DLP triggering content that caused the DLP rule violation and DLP scan metadata (step 760).

The first enforcement node and the second enforcement node can be configured to forward the DLP incident information and not persist the DLP triggering content in memory. The DLP triggering content can include all or a portion of data that triggered the DLP rule violation so that the tenant can determine remediation, and the DLP scan metadata can include a plurality of a DLP dictionary, a DLP engine, a search score, a trigger, a time, a user, and a Uniform Resource Locator (URL).

The DLP rule violation can be a violation of an Exact Data Match (EDM) index provided to the cloud-based system as a hash signature so that underlying data is not accessible by the cloud-based system, and wherein the triggering content includes the hash signature which is converted back to the underlying data at the server for the tenant.

The server can include an Internet Content Adaptation Protocol (ICAP) server that is one of located on-premises with the tenant and located in a cloud system and connected securely to another server located on-premises with the tenant. The first enforcement node can be configured to monitor the traffic that includes any of Secure Sockets Layer (SSL) traffic and Transport Layer Security (TLS) traffic as a proxy.

Indexed Document Matching

Figure 12:
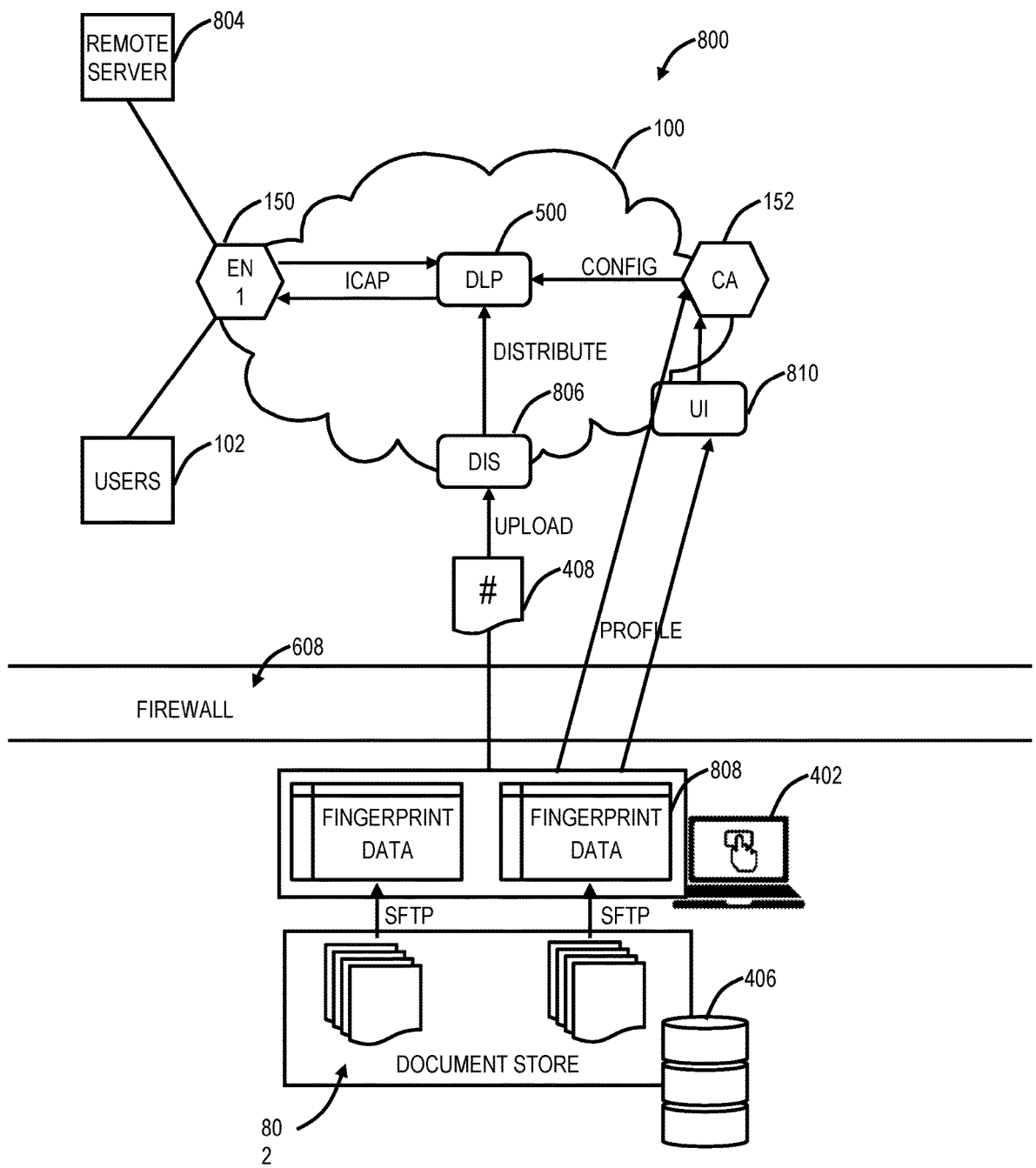
FIG. 12 is a network diagram of a DLP IDM system with the DLP service operating in the cloud-based system to provide index-based DLP matching for a tenant.

FIG. 12 is a network diagram of a DLP IDM system 800 with the DLP service 500 operating in the cloud-based system 100 to provide index-based DLP matching for a tenant. Again, the DLP service 500 is implemented through the cloud-based system 100, such as via ICAP from the enforcement nodes 150. Again, IDM is the ability to identify and protect content that matches the whole or some part of a document from a repository of documents 802. This provides data leak protection for unstructured documents. The DLP service 500 can match a document between a user 102 and a remote server 804 based on a scoring process. The DLP IDM system 800 can include a distribution service 806 that is configured to receive the hash data 408 from the indexing tool 402 and distribute the hash data 408 to the DLP service 500. In IDM, the hash data 408 includes fingerprint data 808 from the documents 802. The DLP IDM system 800 can also include a User Interface (UI) 808 for tenant configuration 810.

Data Protection Objectives

A tenant is concerned with protection that can:

(1) Identify content that is exactly the same as an indexed document 802. In this case, a cryptographic hash of the content matches a cryptographic hash of a file indexed by the tenant through the indexing tool 402.

(2) Identify content that contains the same text as text in an indexed document 802. For example, the text in a Word document is the same as the text in an indexed PDF file. That is, the content may be the same, but the document may be different.

(3) Identify content that contains text, which is a subset of the text in an indexed document 802. For example, the text in content matches one paragraph of the text in an indexed document 802.

(4) Identify content that contains text that is similar but not exactly the same as the text in an indexed file 802. The tenant can specify a threshold for similarity detection. For example, it is considered a match only if 80% of the content matches the text in an indexed file 802.

(5) A tenant can index files into multiple user-defined profiles or categories, such as, for example, legal, financial, engineering, etc. The tenant can also specify the similarity threshold for each profile, such as, for example, legal— match threshold 75%, finance—match threshold 80%, etc.

The objectives in items (1)-(4) can be reduced to the two below requirements.

(i) Similarity detection: same file (1), same text (2), similar text (4), and (ii) Fragment identification: partial content match (3).

The result of the similarity detection and fragment identification can provide a score, such as between 1-100, which is a measure of the confidence of a match to an indexed document 802.

Indexing Tool

Again, the documents 802 are sensitive information for the tenant. It is not advisable or practical to upload the files to the cloud-based system 100. As such, the documents 802 can be indexed via the indexing tool 402 on-premises. That is, the documents 802 do not need to leave an enterprise's secure network. The indexing tool 402 can be realized in a software program, Virtual Machine (VM), etc. that performs indexing functions locally to provide the fingerprint data 808 as the hash data 408 to the cloud-based system 100. The indexing tool 402 can index single files via a UI or specify a directory of files located in a remote Secure File Transfer Protocol (SFTP) location. The indexing tool 402 can also support scheduling and the ability to do scheduled re-indexing of the files to capture the latest revisions and/or new files added to the directory. A tenant can have multiple such indexing tools 402, and they can create multiple document profiles in each tool 402. After the fingerprint data 808 is uploaded to the cloud-based system 100, the data from multiple indexing tools 402 can be combined to create customer-specific indexed data that is grouped by document profiles.

After the files have been indexed via the indexing tool 402, a fingerprint of each file is created. A key point is this fingerprint data 808 cannot be used to recreate the original file. This ensures the confidentiality of the documents 802. That is, the cloud-based system 100 only has access to the hash data 408 (the fingerprint data 808), so there is no concern with the documents 802 in the cloud-based system 100.

Fingerprint Generation

For detecting whether two files are the same, it is possible to use a cryptographic hash, such as MD5 (Message Digest 5) or SHA1 (Shared Hash Algorithm 1). That is, an indexed document 802 has a cryptographic hash value, and monitored content, by the DLP service 500, can be converted to a cryptographic hash value, using the same algorithm. If two cryptographic hash values match, then the monitored content matches the indexed document 802.

However, for similarity and fragment identification, a cryptographic hash is not suitable since minor changes (a single bit) in the content leads to a completely different hash value, which is not comparable to the original hash. Of note, two files that are similar to each other will have large sequences of identical bits in the same order. Thus, for detecting similarity (as opposed to the same file), instead of creating a single hash for a file, the present disclosure includes creating many hashes by dividing the file into discrete pieces, then hashing each piece individually.

Figure 13:
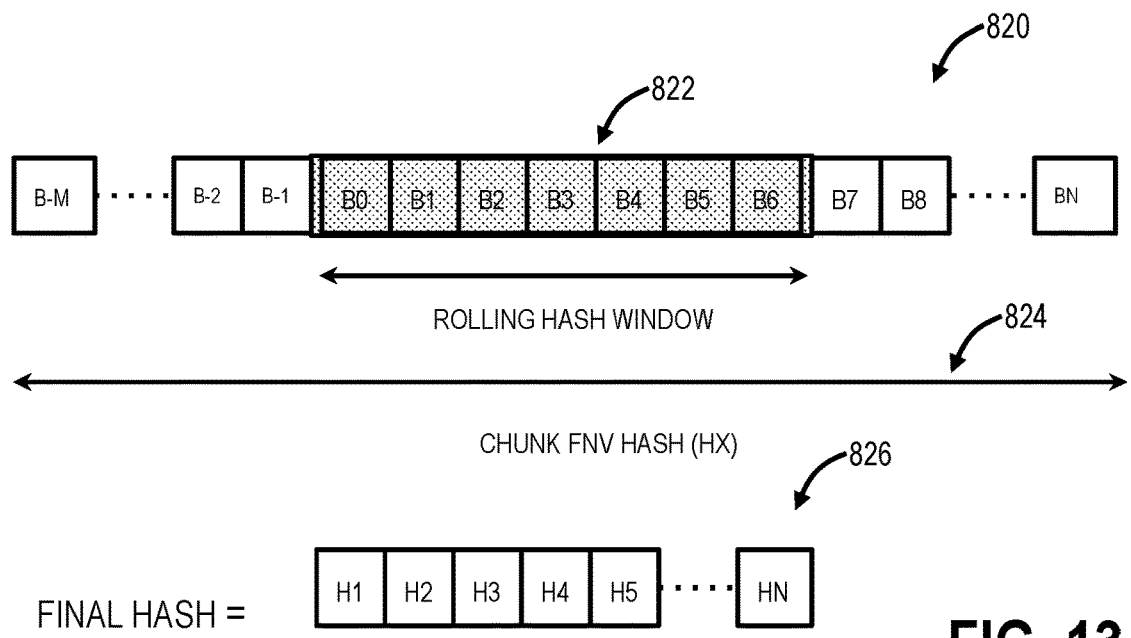
FIG. 13 is a logical diagram of a file that is divided into discrete pieces (labeled B with B-M to BN) for a rolling hash window.

FIG. 13 is a logical diagram of a file 820 that is divided into discrete pieces (labeled B with B-M to BN) for a rolling hash 822. The hash logic used herein for the purpose of similarity detection and fragment identification is based on the concept of Context Triggered Piecewise Hash (CTPH). In an embodiment, a rolling checksum (Rabin-Karp Algorithm) is used to compute a checksum on the current 7 bytes from the input. Concurrently, a non-cryptographic hash 824 like Fowler-Noll-Vo (FNV) is computed in the background on the entire input. Whenever the rolling hash 822 produces a trigger value, the FNV is recorded and then reset. The final resultant hash value of the entire content is a sorted order sequence of FNV hash values 826 computed over variable-length chunks of the input.

The fingerprint data 808 of a file can include a combination of any of the following information 1. A document profile identifier (ID) (customer assigned category);
2. A cryptographic hash;
3. Size of the file;
4. Context Triggered Piecewise Hash (CTPH) (ordered sequence of hashes of variable length chunks of the extracted text);
5. Filename hash; and
6. Encrypted filename.

Again, the fingerprint data 808 includes at least a cryptographic hash of the entire file 820 and an ordered sequence of hashes of variable length chunks of the extracted text, e.g., CTPH. The fingerprint data 808 as bin (binary) files are then uploaded to customer assigned nodes for the distribution service 806. From there, the bin files are distributed to the DLP service 500.

Figure 14:
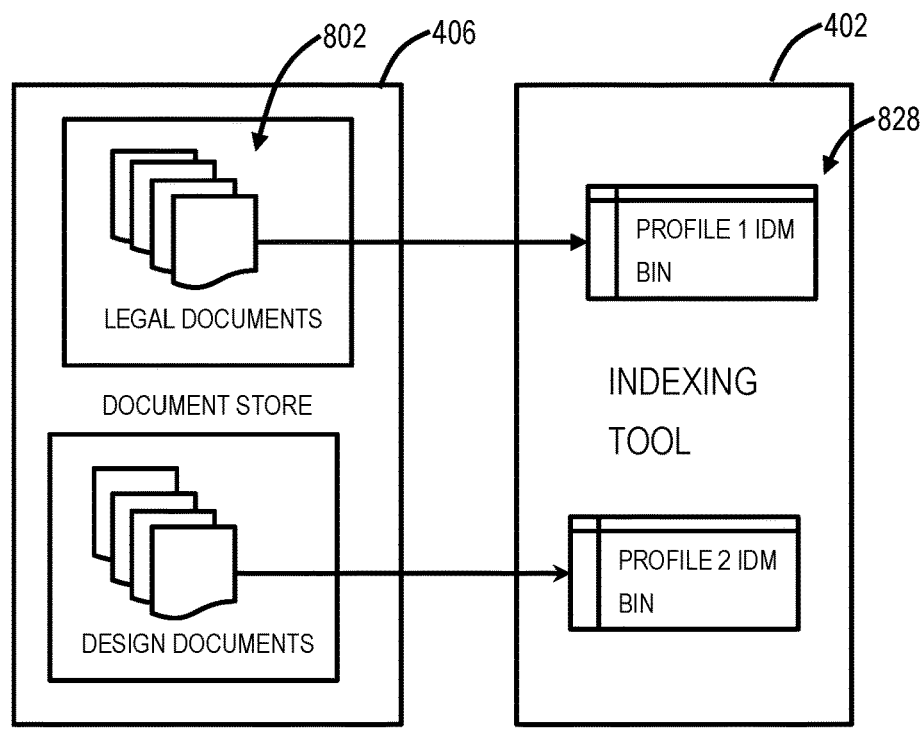
FIG. 14 is a logical diagram of the database with a plurality of documents and the indexing tool that creates bin files.

FIG. 14 is a logical diagram of the database 406 with a plurality of documents 802 and the indexing tool 402 that creates bin files 828. In an embodiment, documents 802 in a certain category, e.g., legal documents, design documents, etc., are separated, such as in a directory, and processed into a bin file 828. In this example, there is a bin file 828 labeled profile 1 IDM bin file for the legal documents and a bin file 828 labeled profile 2 IDM bin file for the design documents. When indexing a directory of files belonging to the same document profile, an IDM bin file 828 is created containing the fingerprint data 808 of all files belonging to the same profile.

IDM Lookup Table Creation

The distribution service 806 and/or the DLP service 500 can create an IDM data lookup table (IDX file) for each new bin file it receives. Also, in case an updated version of a bin file is received, the distribution service 806 and/or the DLP service 500 can update the IDX file for the tenant. The IDM data lookup table (IDX) of each company is a hash table using the CTPH hashes of all files from all profiles as keys, and the values are the remaining fields of the fingerprint data of each file.

Figure 15:
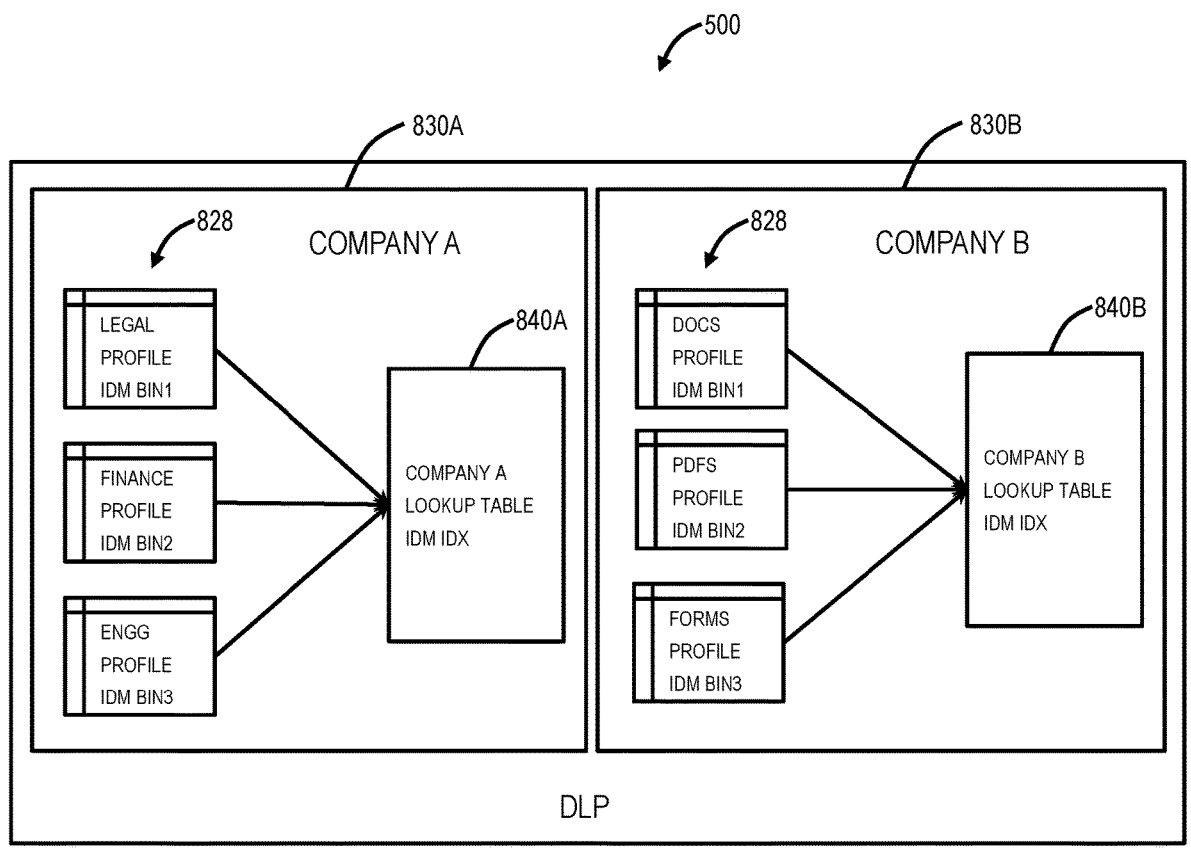
FIG. 15 is a block diagram of IDM lookup table creation via the DLP service for two tenants.

FIG. 15 is a block diagram of IDM lookup table creation via the DLP service 500 for two tenants 830A, 830B. Again, each tenant 830A, 830B can be a different company, organization enterprise, etc. with its own users 102 in the cloud-based system 100. Each tenant 830 has its own documents 802 that are used to create the bin files 828. The bin files 828 are combined into a lookup table 840A, 840B for each tenant 830A, 830B. The lookup table 840A, 840B includes all of the bin files 828 with the cryptographic hashes of each file 802 and with the ordered sequence of hashes of variable length chunks of the extracted text of each file 802. The lookup table 840A, 840B can include all of the fingerprint data 808—
1. A document profile identifier (ID) (customer assigned category);
2. A cryptographic hash;
3. Size of the file;
4. Context Triggered Piecewise Hash (CTPH) (ordered sequence of hashes of variable length chunks of the extracted text);
5. Filename hash; and
6. Encrypted filename.

Also, the lookup table 840A, 840B does not include the actual confidential or sensitive data. With the lookup table 840A, 840B, the DLP service 500 can detect a similarity in monitored content.

Figure 16:
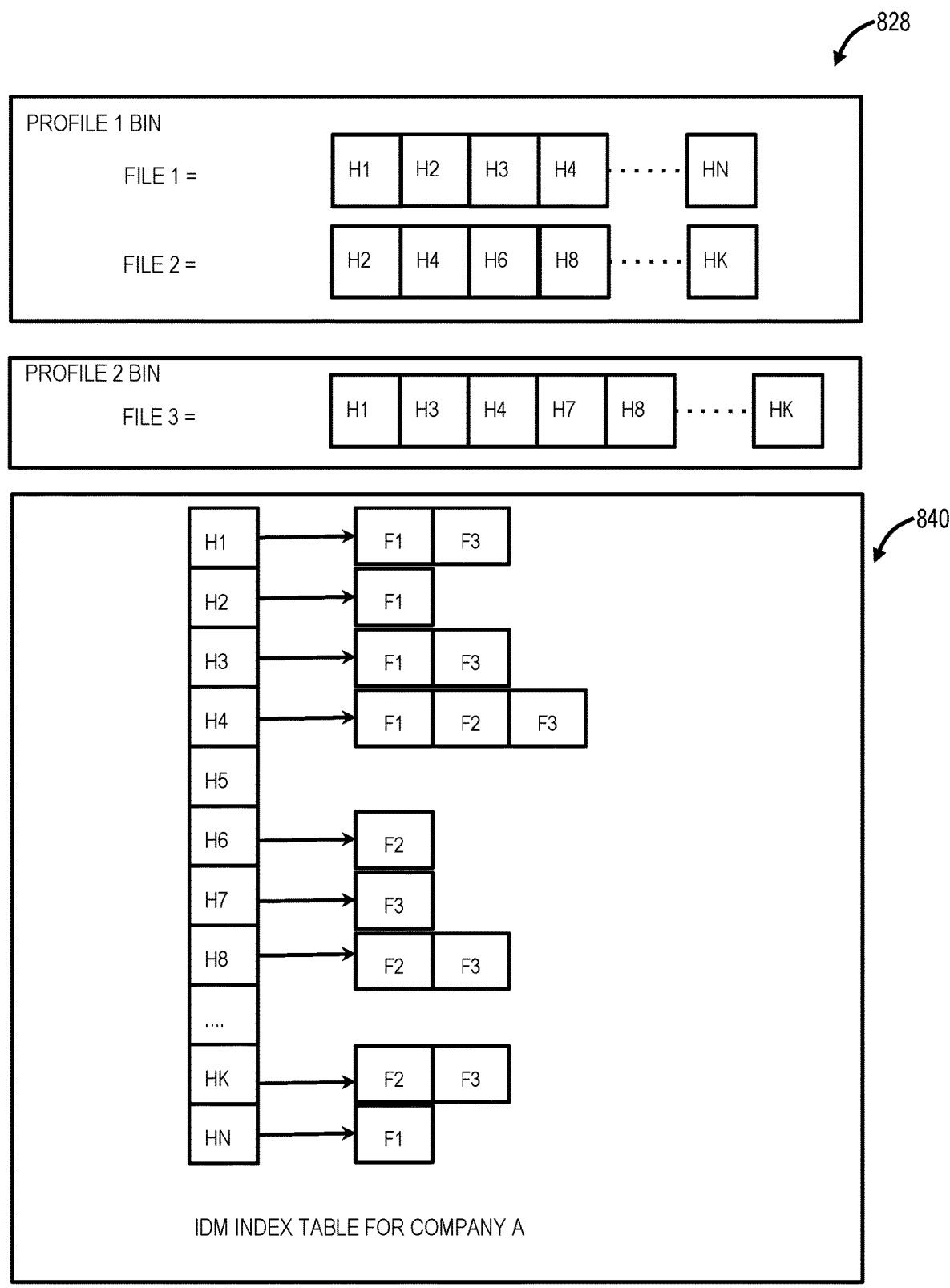
FIG. 16 is a logical diagram of two bin files and an associated lookup table based thereon.

FIG. 16 is a logical diagram of two bin files 828 and an associated lookup table 840 based thereon. In this example, the profile 1 bin file includes two files, file 1 and file 2. The file 1 has hashes H1, H2, H3, H4, . . . HN, and the file 2 has the hashes H2, H4, H6, H6, . . . HK. The profile 2 bin file includes a file 3 with the hashes H1, H3, H4, H7, H8, . . . HK. These hashes H are the ordered sequence of hashes of variable length chunks of the extracted text. Of note, the files 1, 2, 3 do have some of the same text. The lookup table 840 can include a listing of all of the hashes H1, H2, . . . HK, HN, and the corresponding files 1, 2, 3 (labeled F1, F2, F3) where the hashes are found.

IDM Matching

Figure 17:
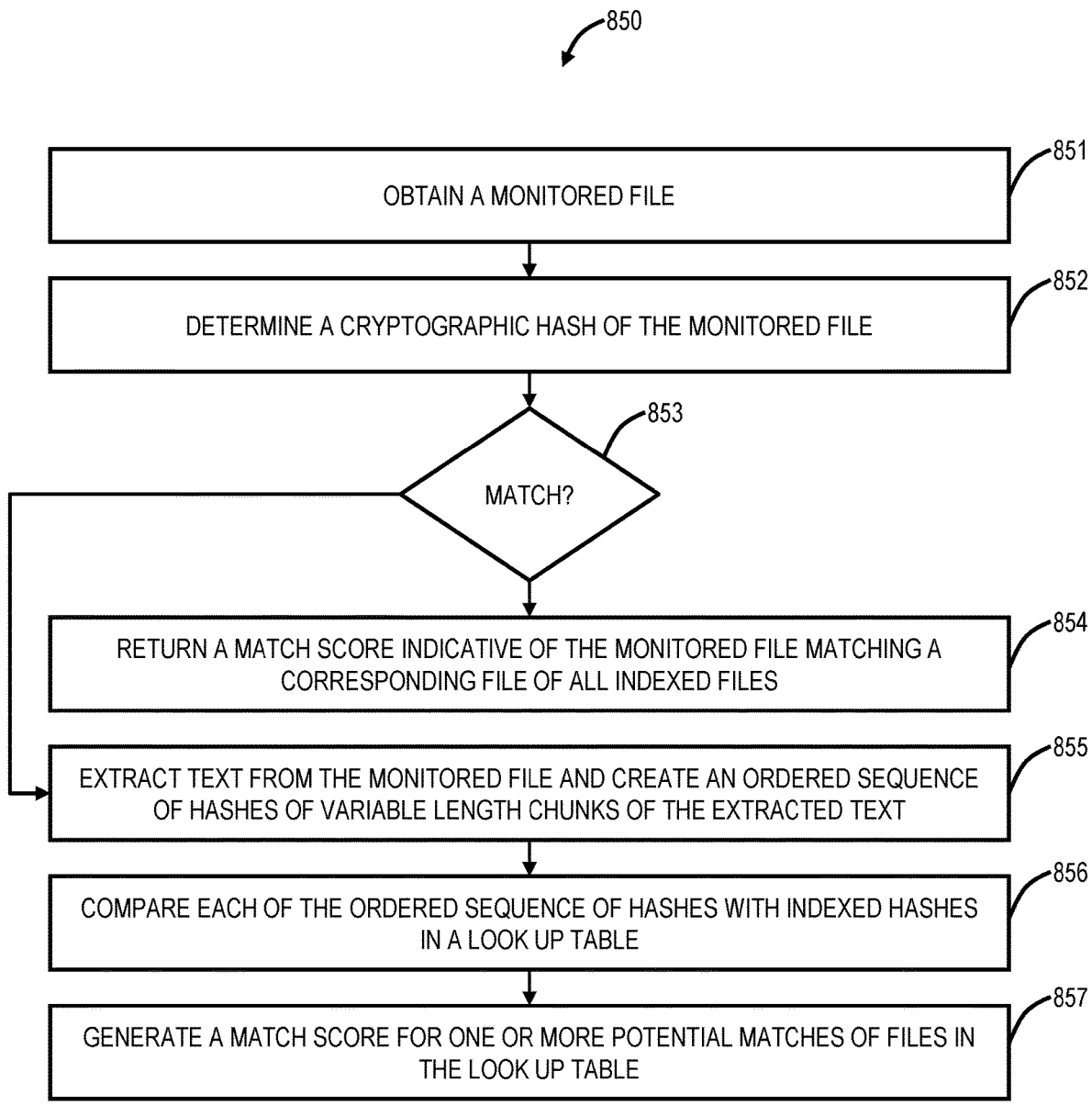
FIG. 17 is a flowchart of index matching of a monitored file for DLP matching to any of the documents.

FIG. 17 is a flowchart of an index matching process 850 of a monitored file for DLP matching to any of the documents 802. The index matching process 850 can be performed via the DLP service 500 through the cloud-based system 100. Prior to implementing the index matching process 850, a plurality of documents 802 are indexed as described herein, and the DLP service 500 has the associated fingerprint data 808, such as via the lookup table 840, etc. The cloud-based system 100 can perform file monitoring as described herein. The DLP service can obtain a monitored file (step 851).

When IDM matching is required against the monitored file, first a cryptographic hash can be calculated (step 852), and compared against the cryptographic hash of all indexed files of the same length as the uploaded file (step 853). Note, the matching process here in step 853 can include matching the cryptographic hash based on the file length. Here, the cryptographic hashes can be indexed by file length so it is not necessary to check different length files. This can speed up the matching process.

If a match is found, the index matching process 850 can return a match score indicative of the monitored file matching a corresponding file of all indexed files (step 854). Assuming the scoring system is 1 to 100, 1 being completely different, and 100 being an exact match, the index matching process 850 can report the match score as 100 for this profile when there is a cryptographic hash match.

If a match is not found (step 853), the index matching process 850 can extract the text from the monitored file and create an ordered sequence of hashes of variable length chunks of the extracted text (step 855). Here, the index matching process 850 uses the content of the monitored file to create the CTPH (Context Triggered Piecewise Hash). This process is the same as file indexing done in the indexing tool 402. CTPH is an ordered sequence of FNV hashes computed on variable-length chunks of the extracted text.

The index matching process 850 can compare each of the ordered sequence of hashes with indexed hashes in a lookup table (step 856), and generate a match score for one or more potential matches of files in the lookup table (step 857). That is, using every FNV hash in the CTPH, a lookup is done into the lookup table for this tenant to generate a candidate set of potential match files. The match score for each candidate file can be computed as the edit distance between its CTPH in the bin file 828 and the CTPH of the monitored file. This score can be scaled to be in the range of 1-100. For each profile, the indexed file with the maximum score can be reported to check if it exceeds a DLP dictionary threshold.

Distributed Policy Enforcement

With the cloud-based system 100 and the DLP service 500, when upload traffic (PUT/POST requests) are scanned by any enforcement node 150, the enforcement node 150, in turn, can forward the request via ICAP to a DLP enforcement node 150B associated with this tenant. The DLP enforcement node 150B will check if this request should be blocked/allowed based on the DLP policy configured for the tenant. As part of the DLP policy enforcement, the DLP enforcement node 1508 can check if all/any of the content matches the content in a customer indexed file. If a match against an indexed file is found and the match score is greater than the configured threshold for the document profile, the filename of the indexed file will be recorded in the transaction logs. If the tenant has configured email notification or incident forwarding, the filename will also be reported in the transaction metadata.

Dual Mode IDM

As described, the above-referenced IDM can be referred to as a text mode for indexed document matching. That is, text is extracted from a file and IDM indexing is performed thereafter. If the file type includes native text (i.e., Microsoft DOC, DOCX, rich text format (RTF), standard text file (.TXT), OpenOffice (.ODT), and the like), then the extracted text exactly matches the native text. Thus, any indexed data matching performed thereon will catch any DLP violations. That is, any matching score will be accurate.

Text extraction can be different in other file types, such as portable document format (PDF) or other image file types. The text extraction here can include optical character recognition (OCR) or similar approaches. This different text extraction can cause slight variations. For example, PDF files may include stray marks and non-embedded text and the corresponding extracted text can have slight differences as well as significant differences. The problem here is a lower match score even though the content is the same, but the text is not exact.

As such, the present disclosure includes so-called dual mode indexed document matching. The first mode is the extracted text and corresponding matching score based on a comparison of the content, based on cryptographic hash match of associated text (text mode). A second mode is provided herein that looks at indexed data matching on a raw byte stream. In embodiments, the text mode performs optimally for same and similar text across different file formats. Although, for similar text (small modifications) in the same file format, the raw byte stream (raw mode) can provide a higher score. For example, a different version of a document will provide a higher score in raw mode. Further, for data presented in tables, diagrams, and the like, the text mode removes formatting and context, where the raw mode provides a higher score.

In embodiments, the two modes (text mode and raw mode) are both utilized, wherein the higher score is used as the IDM match score. That is, a score is determined for both the raw mode and the text mode. In other embodiments, the scores are used in various ways, such as using the scores in combination, a weighted combination, and others known to those of skill in the art.

For partial content matching, a portion of the content from an indexed file can be part of another file, or all of the content from an indexed file can be part of another file. The files can be of the same file format or a different file format. In embodiments, the indexed file may be a subpart of an uploaded file, or the uploaded file may include subparts of the indexed file. For similar content matching, content from an indexed file may be modified slightly in another file, where the files can again be of the same file format or a different file format.

In embodiments, the text mode indexing includes IDM hashes created on the extracted text of a file (i.e., text in a PDF, Word document, and the like). Additionally contemplated herein is raw mode indexing including IDM hashes created on the actual file without text extraction. Again, an indexing tool can be realized in a software program, Virtual Machine (VM), etc. that performs indexing functions locally to provide the fingerprint data as the hash data to the cloud-based system.

In various embodiments, when a file is indexed, 3 sets of hashes are created. The hashes include a cryptographic hash, raw mode IDM hashes, and text mode IDM hashes. When the indexed file is compared to another file, the same hashes (cryptographic hash, raw mode IDM hashes, and text mode IDM hashes) are computed for the monitored file and compared. In the event of the cryptographic hash matching, there is a 100% score, and no IDM hash matches are necessary. Otherwise, the IDM raw mode hashes are compared, and the number of matches are counted, and the IDM text mode hashes are compared, and the number of matches are counted. Again, all sets of matches are used for reporting, wherein the higher score is used as the IDM match score in various embodiments. In other embodiments, the scores are used in various ways, such as using the scores in combination, a weighted combination, and others known to those of skill in the art.

Again, IDM is the ability to identify and protect content that matches the whole or some part of a document from a repository of documents (indexed documents). This provides data leak protection for unstructured documents. The DLP service can match a document between a user and a remote server based on the scoring process. The DLP IDM system can include a distribution service that is configured to receive the hash data from the indexing tool and distribute the hash data to the DLP service.

Figure 18:
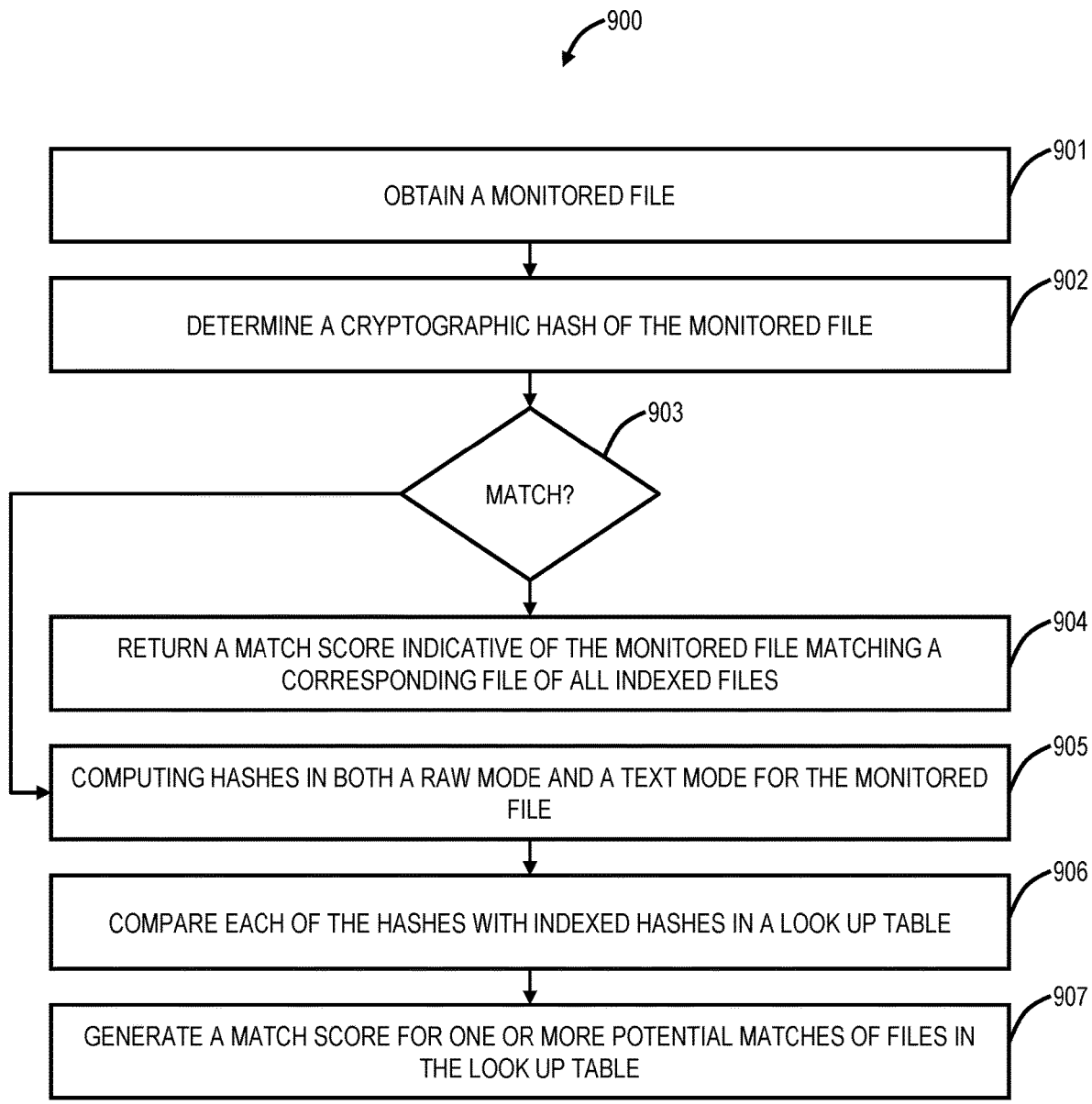
FIG. 18 is a flowchart of dual mode index matching of a monitored file for DLP matching to any of the documents.

FIG. 18 is a flowchart of an index matching process 900 of a monitored file for DLP matching to any of the documents 802. The index matching process 900 can be performed via the DLP service 500 through the cloud-based system 100. Prior to implementing the index matching process 900, a plurality of documents 802 are indexed as described herein, and the DLP service 500 has the associated fingerprint data 808, such as via the lookup table 840, etc. The DLP service can obtain a monitored file (step 901).

When IDM matching is required against the monitored file, first a cryptographic hash, raw mode IDM hashes, and text mode IDM hashes can be calculated (step 902), and compared against the hashes of all indexed files (step 903). Note, as in previous embodiments, the matching process here in step 903 can include matching the hashes based on the file length. Here, the hashes can be indexed by file length, so it is not necessary to check different length files. This can speed up the matching process.

If matches are found, the index matching process 900 can return a match score indicative of the monitored file matching a corresponding file of all indexed files (step 904). Assuming the scoring system is 1 to 100, 1 being completely different, and 100 being an exact match, the index matching process 900 can report the match score as 100 for this profile when there is a cryptographic hash match. Additionally, if a cryptographic match is found, the IDM hash matching for the raw mode and the text mode are not performed.

If a cryptographic match is not found (step 903), the index matching process 900 can compute hashes for both a raw mode and a text mode for the monitored file and create an ordered sequence of hashes of variable length chunks (step 905). Here, for the text mode, the index matching process 900 uses the content of the monitored file to create the CTPH (Context Triggered Piecewise Hash). This process is the same as file indexing done in the indexing tool 402. CTPH is an ordered sequence of FNV hashes computed on variable-length chunks of the extracted text.

The index matching process 900 can compare each of the hashes with indexed hashes in a lookup table (step 906), and generate a match score for one or more potential matches of files in the lookup table (step 907). Again, in embodiments, the two modes (text mode and raw mode) are both utilized, wherein the higher score is used as the IDM match score. In other embodiments, the scores are used in various ways, such as using the scores in combination, a weighted combination, and others known to those of skill in the art. That is, using every FNV hash in the CTPH, a lookup is done into the lookup table for this tenant to generate a candidate set of potential match files. The match score for each candidate file can be computed as the edit distance between its CTPH in the bin file 828 and the CTPH of the monitored file. This score can be scaled to be in the range of 1-100. For each profile, the indexed file with the maximum score can be reported to check if it exceeds a DLP dictionary threshold.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming one or more processors to perform steps of:
    obtaining a file to be checked for Data Loss Prevention (DLP);
    determining a cryptographic hash of the file and comparing the cryptographic hash to corresponding cryptographic hashes of indexed files;
    responsive to a match between the cryptographic hash and one of the corresponding cryptographic hashes, determining a DLP match and performing an action based thereon;
    responsive to no match, computing hashes in a raw mode and a text mode for the monitored file, wherein the computing hashes for both the raw mode and the text mode comprises creating an ordered sequence of hashes of variable length chunks; and
    determining the DLP match with one of the indexed files based on comparing the hashes from the raw mode and text mode with corresponding hashes of the indexed files wherein the determining the DLP match based on the comparing the hashes utilizes a match score, wherein the match score is a highest score between a raw mode score and a text mode score.

2. The non-transitory computer-readable storage medium of claim 1, wherein the determining the DLP match based on the comparing the hashes utilizes a match score based on a number of the hashes that match and the DLP match is based on the match score being above a threshold.

3. The non-transitory computer-readable storage medium of claim 2, wherein the threshold is user-configurable in value and configurable across a different profile of the indexed files.

4. The non-transitory computer-readable storage medium of claim 1, wherein the steps further include
    responsive to the DLP match based on the comparing the hashes from the raw mode and text mode, performing an action based thereon.

5. The non-transitory computer-readable storage medium of claim 1, wherein the steps further include
    prior to the obtaining the file, obtaining a lookup table for a tenant associated with a user of the file, wherein the lookup table includes raw mode and text mode hashes indexed to the indexed files.

6. The non-transitory computer-readable storage medium of claim 5, wherein the lookup table is created in an indexing tool, and wherein the indexed files cannot be recreated from data in the lookup table.

7. The non-transitory computer-readable storage medium of claim 1, wherein the file is of a first file type, and wherein the file is determined to match one of the indexed files being a second file type.

8. The non-transitory computer-readable storage medium of claim 1, wherein the file is of a file type, and wherein the file is determined to match one of the indexed files being the same file type.

9. The non-transitory computer-readable storage medium of claim 1, wherein the file is determined to match one of the indexed files having similar text therein.

10. A method comprising steps of:
    obtaining a file to be checked for Data Loss Prevention (DLP);
    determining a cryptographic hash of the file and comparing the cryptographic hash to corresponding cryptographic hashes of indexed files;
    responsive to a match between the cryptographic hash and one of the corresponding cryptographic hashes, determining a DLP match and performing an action based thereon;
    responsive to no match, computing hashes in a raw mode and a text mode for the monitored file, wherein the computing hashes for both the raw mode and the text mode comprises creating an ordered sequence of hashes of variable length chunks; and
    determining the DLP match with one of the indexed files based on comparing the hashes from the raw mode and text mode with corresponding hashes of the indexed files wherein the determining the DLP match based on the comparing the hashes utilizes a match score, wherein the match score is a highest score between a raw mode score and a text mode score.

11. The method of claim 10, wherein the determining the DLP match based on the comparing the hashes utilizes a match score based on a number of the hashes that match and the DLP match is based on the match score being above a threshold.

12. The method of claim 11, wherein the threshold is user-configurable in value and configurable across a different profile of the indexed files.

13. The method of claim 10, wherein the steps further include
responsive to the DLP match based on the comparing the hashes from the raw mode and text mode, performing an action based thereon.

14. The method of claim 10, wherein the steps further include
prior to the obtaining the file, obtaining a lookup table for a tenant associated with a user of the file, wherein the lookup table includes raw mode and text mode hashes indexed to the indexed files.

15. The method of claim 14, wherein the lookup table is created in an indexing tool, and wherein the indexed files cannot be recreated from data in the lookup table.

16. The method of claim 10, wherein the file is of a first file type, and wherein the file is determined to match one of the indexed files being a second file type.

17. The method of claim 10, wherein the file is of a file type, and wherein the file is determined to match one of the indexed files being the same file type.

18. The method of claim 10, wherein the file is determined to match one of the indexed files having similar text therein.

* * * * *